US011283332B2

(12) United States Patent
Kitao et al.

(10) Patent No.: US 11,283,332 B2
(45) Date of Patent: Mar. 22, 2022

(54) ROTATING ELECTRIC MACHINE

(71) Applicant: Mitsubishi Electric Corporation, Tokyo (JP)

(72) Inventors: Junji Kitao, Tokyo (JP); Tomohira Takahashi, Tokyo (JP); Yusuke Kimoto, Tokyo (JP); Yoshihiro Miyama, Tokyo (JP); Masatsugu Nakano, Tokyo (JP); Yuya Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 104 days.

(21) Appl. No.: 16/614,607

(22) PCT Filed: Feb. 26, 2018

(86) PCT No.: PCT/JP2018/006989
§ 371 (c)(1),
(2) Date: Nov. 18, 2019

(87) PCT Pub. No.: WO2019/008820
PCT Pub. Date: Jan. 10, 2019

(65) Prior Publication Data
US 2020/0186007 A1   Jun. 11, 2020

(30) Foreign Application Priority Data
Jul. 5, 2017   (JP) .............................. JP2017-131896

(51) Int. Cl.
*H02K 9/19*       (2006.01)
*H02K 1/32*       (2006.01)
(Continued)

(52) U.S. Cl.
CPC ................. *H02K 9/19* (2013.01); *H02K 1/20* (2013.01); *H02K 1/276* (2013.01); *H02K 1/32* (2013.01); *H02K 15/03* (2013.01)

(58) Field of Classification Search
CPC H02K 9/19; H02K 15/03; H02K 1/20; H02K 1/276; H02K 1/32; H02K 1/22; H02K 1/27; H02K 1/2766
(Continued)

(56) References Cited

U.S. PATENT DOCUMENTS

2007/0052313 A1   3/2007  Takahashi et al.
2009/0261667 A1*  10/2009 Matsubara ........... H02K 1/2766
                                                    310/54
(Continued)

FOREIGN PATENT DOCUMENTS

CN    105814779 A    7/2016
JP    2009-171785 A  7/2009
(Continued)

OTHER PUBLICATIONS

Communication dated Mar. 17, 2021 from The State Intellectual Property Office of P R. of China in English Application No. 201880044041.7.
(Continued)

*Primary Examiner* — Alex W Mok
(74) *Attorney, Agent, or Firm* — Sughrue Mion, PLLC; Richard C. Turner

(57) ABSTRACT

In a rotating electric machine, a rotor core has a rotor core cooling hole under a state of being coupled to a first gap at a position on a radially inner side with respect to a center portion of a first inner wall surface in a length direction. The rotor core has a radially-outer-side refrigerant flow path formed under a state of being coupled to a radially-outer-side end portion of the first gap. A first end plate has a
(Continued)

communication path formed so as to extend from an inner end surface of the first end plate to the rotor core cooling hole. A second end plate has a discharge path formed so as to allow the radially-outer-side refrigerant flow path to communicate with an outside.

15 Claims, 13 Drawing Sheets

(51) Int. Cl.
   *H02K 1/27* (2006.01)
   *H02K 15/03* (2006.01)
   *H02K 1/20* (2006.01)
   *H02K 1/276* (2022.01)

(58) Field of Classification Search
   USPC .......................................................... 310/58
   See application file for complete search history.

(56) References Cited

U.S. PATENT DOCUMENTS

| | | | | |
|---|---|---|---|---|
| 2010/0194220 A1* | 8/2010 | Tatematsu | ............ | H02K 1/2766 310/61 |
| 2013/0020889 A1* | 1/2013 | Yamamoto | ............ | H02K 1/2766 310/59 |
| 2013/0038151 A1* | 2/2013 | Ohashi | ................ | H02K 5/1737 310/59 |
| 2013/0334912 A1 | 12/2013 | Tokunaga et al. | | |
| 2015/0137650 A1* | 5/2015 | Takahashi | ............ | H02K 1/2766 310/156.56 |
| 2016/0149450 A1 | 5/2016 | Horii et al. | | |
| 2016/0261158 A1 | 9/2016 | Horii et al. | | |
| 2016/0301268 A1* | 10/2016 | Watanabe | ................ | H02K 9/19 |
| 2016/0372983 A1 | 12/2016 | Okochi | | |
| 2018/0091011 A1 | 3/2018 | Higashino et al. | | |

FOREIGN PATENT DOCUMENTS

| | | |
|---|---|---|
| JP | 2014-197970 A | 7/2009 |
| JP | 2010-220340 A | 9/2010 |
| JP | 2012-105487 A | 5/2012 |
| JP | 2014-183602 A | 9/2014 |
| JP | 2016-049005 A | 4/2016 |
| JP | 2016-158365 A | 9/2016 |
| JP | 6017067 B2 | 10/2016 |
| JP | 2017-005961 A | 1/2017 |
| WO | 2012/118140 A1 | 9/2012 |
| WO | 2016/186024 A1 | 11/2016 |

OTHER PUBLICATIONS

Communication dated Jan. 25, 2021, from the German Intellectual Property Office in Application No. English 11 2018 003 438.0.
International Search Report for PCT/JP2018/006989 dated May 22, 2018.
Written Opinion for PCT/JP2018/006989 dated May 22, 2018.

* cited by examiner

ROTATING ELECTRIC MACHINE

CROSS REFERENCE TO RELATED APPLICATIONS

This application is a National Stage of International Application No. PCT/JP2018/006989 filed Feb. 26, 2018, claiming priority based on Japanese Patent Application No. 2017-131896 filed Jul. 5, 2017.

TECHNICAL FIELD

The present invention relates to a rotating electric machine including a rotor having permanent magnets embedded therein, and in particular, to a cooling structure for the permanent magnets.

BACKGROUND ART

In rotating electric machines applied to, for example, industrial motors, electric vehicles, and hybrid vehicles, there are demands for downsizing and higher output, and a rotating electric machine including a rotor having neodymium magnets embedded therein is widely used. However, a magnet temperature becomes higher due to an eddy loss in the magnets and reception of heat from a rotor core or stator coils. When the magnet temperature becomes higher, a coercive force is decreased, with the result that the magnets become more liable to be demagnetized. In particular, in the electric vehicles or hybrid vehicles, the rotating electric machine is used under a high temperature environment, and hence a countermeasure against demagnetization of the magnets is required. Therefore, in order to maintain the coercive force even at high temperature, a measure of adding dysprosium is taken. However, a rare earth element such as dysprosium is expensive, which leads to a problem of increase in cost for magnets.

In view of such a circumstance, various cooling structures for the magnets have been proposed.

For example, in a related-art rotating electrical machine described in Patent Literature 1, oil, which is stored in an oil reservoir formed on a radially inner side of a rotor core holding portion, is supplied by a centrifugal force through a first oil path to a second oil path, which extends in an axial direction along back surfaces of permanent magnets, to cool permanent magnets.

Further, in a related-art rotating electric machine described in Patent Literature 2, oil supplied to an axial center position of a shaft is supplied to flux barriers of a rotor core through communication oil paths formed in end plates to cool permanent magnets.

CITATION LIST

Patent Literature

[PTL 1] JP 2016-158365 A
[PTL 2] JP 2012-105487 A

SUMMARY OF INVENTION

Technical Problem

However, in the related-art rotating electric machine described in Patent Literature 1, an outer diameter of the rotor core holding portion is increased. Therefore, in applications involving use of a radially inner portion of the rotor core, a volume of the rotor core holding portion is decreased. Therefore, it is difficult to apply the rotating electric machine to such applications.

In the related-art rotating electric machine described in Patent Literature 2, the oil flows along wall surfaces, which are formed by one short side of each of the permanent magnets having a rectangular cross-section and exposed to the flux barriers. Therefore, a cooling area of the permanent magnets is reduced, with the result that the permanent magnets cannot be effectively cooled.

The present invention has been made to solve the above problems described above, and has an object to provide a rotating electric machine which is increased in cooling area of permanent magnets to effectively cool permanent magnets so that cooling performance for the permanent magnets is enhanced, and which can be applied to applications involving use up to a radially inner portion of a rotor core.

Solution to Problem

According to one embodiment of the present invention, there is provided a rotating electric machine, including: a rotor including: a rotor core, which is firmly fixed to a shaft, and has a plurality of magnet accommodating holes, which penetrate the rotor core in an axial direction, in a circumferential direction; a first end plate and a second end plate mounted to the shaft under a state of being in contact with both end surfaces of the rotor core in the axial direction; and permanent magnets accommodated in the magnet accommodating holes; and a stator arranged coaxially with the rotor on an outer peripheral side of the rotor. The magnet accommodating holes each have a first inner wall surface and a second inner wall surface facing each other in parallel, and a length direction orthogonal to an axial direction of the first inner wall surface is inclined in a circumferential direction with respect to a radial direction. Each of the permanent magnets is formed so as to have a rectangular cross-section, includes a first outer wall surface and a second outer wall surface, which are formed by a pair of long sides of the rectangular cross-section, and a third outer wall surface and a fourth outer wall surface, which are formed by a pair of short sides of the rectangular cross-section, and is accommodated in the magnet accommodating hole while a first gap is defined between the first outer wall surface and the first inner wall surface, and the third outer wall surface is oriented radially outward. The rotor core has a rotor core cooling hole formed so as to penetrate the rotor core in the axial direction under a state of being coupled to the first gap at a position on a radially inner side with respect to a center portion of the first inner wall surface in the length direction. The rotor core has a radially-outer-side refrigerant flow path formed so as to penetrate the rotor core in the axial direction along the third outer wall surface of the permanent magnet under a state of being coupled to a radially-outer-side end portion of the first gap. The first end plate has a communication path formed so as to extend from an inner end surface of the first end plate to the rotor core cooling hole. The second end plate has a discharge path formed so as to allow the radially-outer-side refrigerant flow path to communicate with an outside. The shaft has a refrigerant supply path for allowing a refrigerant to be supplied from a pressure source to the communication path.

Advantageous Effects of Invention

According to the present invention, the refrigerant supplied from the communication path to the rotor core cooling holes flows through the rotor core cooling holes into the first gaps, and flows through the first gaps into the radially-outer-side refrigerant flow path. After flowing through the radially-outer-side refrigerant flow path, the refrigerant is discharged from the discharge path. As described above, the refrigerant flows along the first outer wall surfaces and the third outer wall surfaces of the permanent magnets. Therefore, the cooling area of the permanent magnets is increased, and the permanent magnets are effectively cooled, thereby improving the cooling performance for the permanent magnets.

Further, the refrigerant is supplied to the rotor core cooling holes through the communication path formed in the first end plate. Therefore, the rotating electric machine can be applied to applications involving use up to the radially inner portion of the rotor core.

DESCRIPTION OF EMBODIMENTS

First Embodiment

Figure 1:
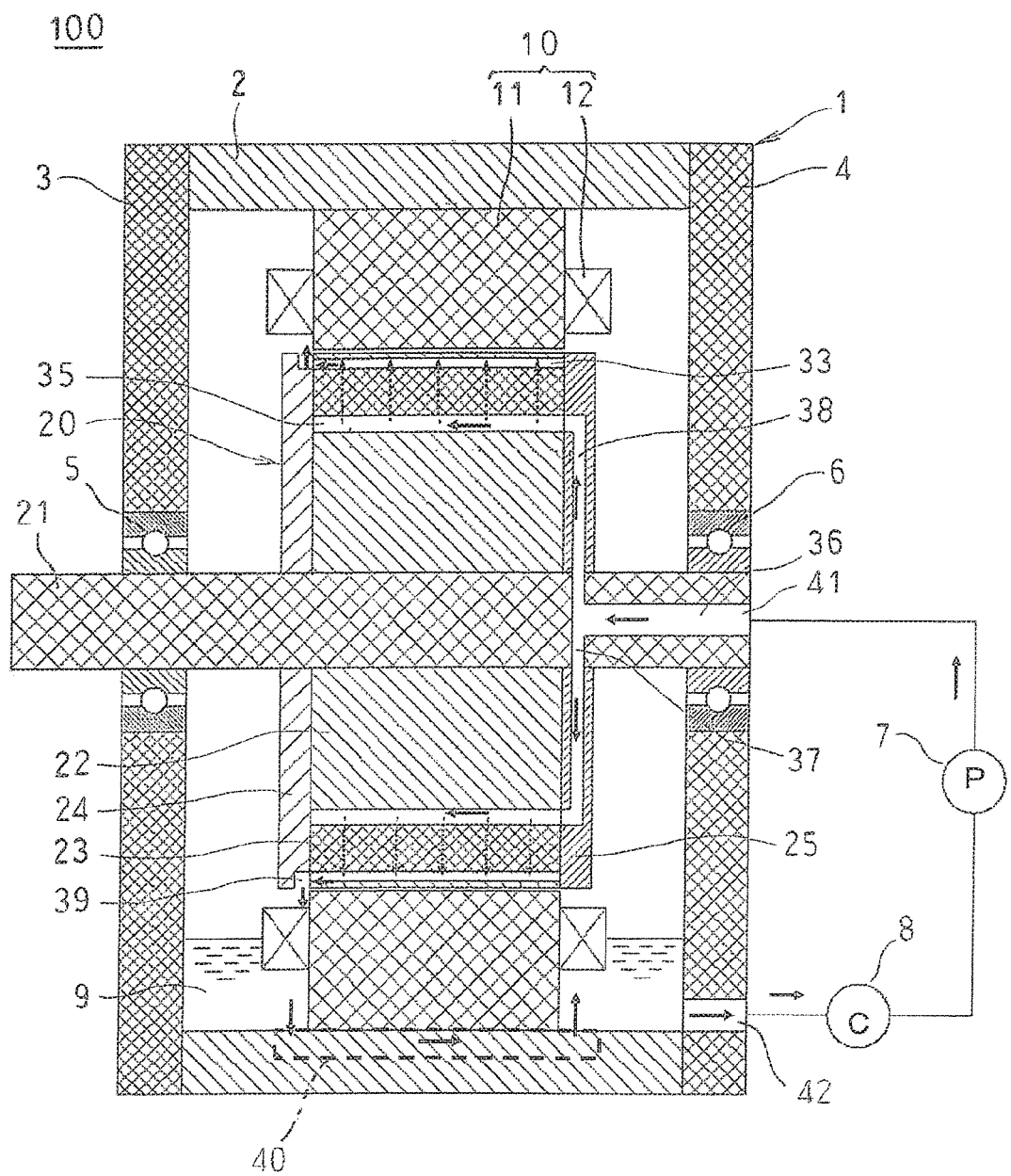
FIG. 1 is a longitudinal sectional view for illustrating a rotating electric machine according to a first embodiment of the present invention.
Figure 2:
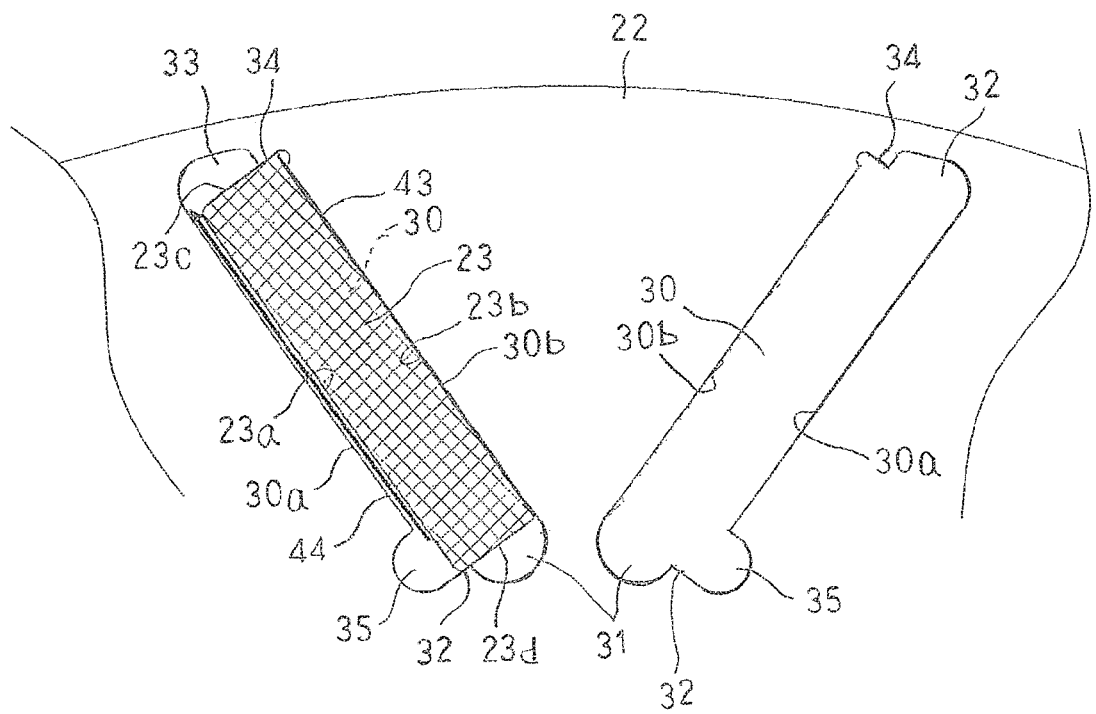
FIG. 2 is a transverse sectional view for illustrating magnet accommodating holes and a periphery thereof of a rotor core in the rotating electric machine according to the first embodiment of the present invention.

FIG. 1 is a longitudinal sectional view for illustrating a rotating electric machine according to a first embodiment of the present invention. FIG. 2 is a transverse sectional view for illustrating main portions of magnet accommodating holes and a periphery thereof of a rotor core in the rotating electric machine according to the first embodiment of the present invention. A longitudinal sectional view is a sectional view for illustrating a cross-section including an axial center of a shaft, and a transverse sectional view is a sectional view for illustrating a cross-section orthogonal to the axial center of the shaft. In FIG. 1 and FIG. 2, arrows indicate flows of cooling oil serving as a refrigerant. In FIG. 2, only a part corresponding to one pole is illustrated. In FIG. 2, for convenience of description, one of permanent magnets 23 is omitted.

In FIG. 1 and FIG. 2, a rotating electric machine 100 includes a housing 1, a rotor 20, and a stator 10. The rotor 20 is arranged in the housing 1 so as to be rotatable. The stator 10 is arranged so as to surround the rotor 20 and be coaxial with the rotor 20, and is held in the housing 1. The housing 1 is divided into three segments including an annular frame 2, a load-side bracket 3, and a counter-load-side bracket 4. Further, a magnetic gap portion is defined between the stator 10 and the rotor 20.

The stator 10 includes an annular stator core 11 and stator coils 12 mounted to the stator core 11. The stator 10 is arranged in the frame 2 by inserting and holding the stator core 11 in the frame 2 through press-fitting or shrink-fitting.

The load-side bracket 3 and the counter-load-side bracket 4 are arranged so as to sandwich the frame 2 from both sides in an axial direction, and are integrated by, for example, a fastening force of fastening bolts (not shown). A shaft 21 of the rotor 20 is supported by a load-side bearing 5 and a counter-load-side bearing 6 which are held in the load-side bracket 3 and the counter-load-side bracket 4, respectively.

The rotor 20 includes a rotor core 22, permanent magnets 23, a load-side end plate 24, and a counter-load-side end plate 25. The rotor core 22 is formed of laminated magnetic thin plates punched out from, for example, magnetic steel sheets, and is firmly fixed to the shaft 21, which penetrates at an axial center position. The permanent magnets 23 are embedded so as to penetrate the rotor core 22 in the axial direction. The load-side end plate 24 and the counter-load-side end plate 25 are arranged at both ends of the rotor core 22 in the axial direction and prevent the rotor core 22 and the permanent magnets 23 from falling off. Here, the load-side end plate 24 serves as a second end plate, and the counter-load-side end plate 25 serves as a first end plate.

Magnet accommodating holes 30 each have a first inner wall surface 30a and a second inner wall surface 30b facing each other in parallel, and are formed so as to penetrate the rotor core 22 in the axial direction with respective hole directions oriented in the axial direction. Two magnet accommodating holes 30 are arranged in a V-shape arrangement in plane symmetry with respect to a plane including the axial center of the shaft 21, in which the second inner wall surfaces 30b face each other, and a distance therebetween gradually increases toward a radially outer side. Pairs of magnet accommodating holes 30 arranged in the V-shape arrangement are arrayed in a circumferential direction at constant pitches by the number of poles of the rotor 20. When a direction of the second inner wall surface 30b orthogonal to the axial direction is defined as a length direction, length directions of the second inner wall surfaces 30b of the pair of magnet accommodating holes 30 are inclined toward opposite sides in the circumferential direction with respect to a radial direction.

A radially-inner-side flux barrier 31 is formed so as to be continuous to a radially inner side of the second inner wall surface 30b of the magnet accommodating hole 30 in the length direction and penetrate the rotor core 22 in the axial direction. A radially-inner-side magnet holding portion 32 is formed so as to protrude toward the second inner wall surface 30b side at a radially-inner-side end portion of the first inner wall surface 30a of the magnet accommodating hole 30.

A radially-outer-side flux barrier 33 forming a radially-outer-side refrigerant flow path is formed so as to be continuous to a radially outer side of the first inner wall surface 30a of the magnet accommodating hole 30 in the length direction and penetrate the rotor core 22 in the axial direction. A radially-outer-side magnet holding portion 34 is formed so as to protrude toward the first inner wall surface 30a side at a radially-outer-side end portion of the second inner wall surface 30b of the magnet accommodating hole 30.

A rotor core cooling hole 35 is formed by causing the radially-inner-side end portion and a vicinity thereof of the first inner wall surface 30a of the magnet accommodating hole 30 to protrude in a direction away from the second inner wall surface 30b.

The radially-inner-side flux barriers 31, the radially-outer-side flux barriers 33, and the rotor core cooling holes 35, which communicate with the magnet accommodating holes 30 arranged in the V-shape arrangement, are also in plane symmetry with respect to the plane including the axial center of the shaft 21.

The permanent magnets 23 are each formed into a rectangular parallelepiped having an axial length of the rotor core 22. That is, the permanent magnets 23 each have four surfaces including a first outer wall surface 23a and a second outer wall surface 23b, which are formed by a pair of long sides of the rectangular cross-section, and a third outer wall surface 23c and a fourth outer wall surface 23d, which are formed by a pair of short sides of the rectangular cross-section. The permanent magnets 23 are accommodated in a pair of magnet accommodating holes 30, in which the first outer wall surfaces 23a face the first inner wall surfaces 30a, and the third outer wall surfaces 23c are oriented radially outward. Each permanent magnet 23 is arranged close to the load-side end plate 24 side so as to be in contact with the load-side end plate 24. Under a state in which the third outer wall surface 23c and the fourth outer wall surface 23d are in contact with the radially-outer-side magnet holding portion 34 and the radially-inner-side magnet holding portion 32 so that movement of the permanent magnet 23 is restricted in the length direction of the second inner wall surface 30b, the second outer wall surface 23b is fixed to the second inner wall surface 30b with an adhesive 43. A first gap 44 is defined between the first inner wall surface 30a of the magnet accommodating hole 30 and the first outer wall surface 23a of the permanent magnet 23. The radially-outer-side flux barrier 33 and the rotor core cooling hole 35 communicate with each other through the first gap 44.

In the two permanent magnets 23 accommodated in the pair of magnet accommodating holes 30 arranged in the V-shape arrangement, directions orthogonal to the first outer wall surfaces 23a and the second outer wall surfaces 23b are defined as magnetization directions, and the permanent magnets are magnetized so that the same poles face each other to form one pole. In such a manner, the pairs of permanent magnets 23 forming one pole are arrayed at constant pitches in the circumferential direction by the number of poles of the rotor 20, while polarities of the pairs on the radially outer side are alternately changed.

A communication path 38 is formed so as to extend from an inner end surface of the counter-load-side end plate 25 to the rotor core cooling holes 35, and further from the inner end surface of the counter-load-side end plate 25 to the radially-inner-side flux barriers 31. Openings of the radially-outer-side flux barriers 33 on the counter load side are closed by the counter-load-side end plate 25. Further, openings of the first gaps 44 on the counter load side allowing the radially-outer-side flux barriers 33 to communicate with the rotor core cooling holes 35 are closed by the counter-load-side end plate 25.

A discharge path 39 is formed so as to allow the radially-outer-side flux barriers 33 to communicate with a radially outer side of the load-side end plate 24, and to allow the radially-inner-side flux barriers 31 to communicate with the radially outer side of the load-side end plate 24. Openings of the rotor core cooling holes 35 on the load side are closed by the load-side end plate 24. Further, openings of the first gaps 44 on the load side allowing the radially-outer-side flux barriers 33 to communicate with the rotor core cooling holes 35 are closed by the load-side end plate 24.

A first shaft refrigerant path 36 is formed at the axial center position of the shaft 21 so as to extend from an end portion on the counter load side to an arrangement position of the counter-load-side end plate 25. A second shaft refrigerant path 37 is formed in the shaft 21 so as to be branched in radial directions being flow path directions from the first shaft refrigerant path 36 to extend to the communication path 38, respectively. The first shaft refrigerant path 36 and the second shaft refrigerant path 37 are refrigerant supply paths for supplying cooling oil 9 to the communication path 38.

An axial communication path 40 is formed at a lower end portion of the frame 2 in the vertical direction so as to allow both sides of the stator core 11 in the axial direction to communicate with each other.

A refrigerant discharge port 42 is formed in the counter-load-side end plate 25 so as to allow a lower end side in an inner space of the housing 1 in the vertical direction to communicate with an outside. An opening of the first shaft refrigerant path 36 serves as a refrigerant supply port 41.

Description is given of a method of cooling the permanent magnets 23 in the rotating electric machine 100 having the configuration described above with reference to FIG. 1 and FIG. 2.

The cooling oil 9 is pumped from the refrigerant supply port 41 to the first shaft refrigerant path 36 by an external pump 7 serving as a pressure source, and flows from the second shaft refrigerant path 37 into the communication path 38. A part of the cooling oil 9, which has flowed into the communication path 38, flows into the radially-inner-side flux barriers 31, flows in the axial direction along the fourth outer wall surfaces 23d of the permanent magnets 23, and is discharged radially outward through the discharge path 39.

The remaining part of the cooling oil 9, which has flowed into the communication path 38, flows into the rotor core cooling holes 35 to flow through the rotor core cooling holes 35 in the axial direction. The openings of the rotor core cooling holes 35 on the load side are closed, and hence the cooling oil 9 flowing through the rotor core cooling holes 35 in the axial direction flows into the first gaps 44 by a pumping force of the pump 7 and a centrifugal force generated by rotations of the rotor 20. The cooling oil 9, which has flowed into the first gaps 44, flows along the first outer wall surfaces 23a of the permanent magnets 23 to flow into the radially-outer-side flux barriers 33. The cooling oil 9, which has flowed into the radially-outer-side flux barriers 33, flows along the third outer wall surfaces 23c of the permanent magnets 23 in the axial direction, and is discharged radially outward through the discharge path 39.

The cooling oil 9, which has been discharged from the discharge path 39, is scattered by the centrifugal force, and after cooling load-side coil ends of the stator coil 12, is dropped to be accumulated on the lower end side in the inner space of the housing 1 in the vertical direction. The cooling oil 9 accumulated on the lower end side in the inner space of the housing 1 in the vertical direction is discharged from the refrigerant discharge port 42, and is returned to the pump 7 through an oil cooler 8. On this occasion, the cooling oil 9 accumulated on the load side of the stator 10 flows toward the counter load side of the stator 10 through the axial communication path 40.

The path extending through the radially-inner-side flux barriers 31 to the discharge path 39 and the path extending through the rotor core cooling holes 35, the first gaps 44, and the radially-outer-side flux barriers 33 to the discharge path 39 are independent of each other.

According to the first embodiment, the radially-inner-side flux barriers 31 and the rotor core cooling holes 35 are isolated from each other, and the flow path extending through the radially-inner-side flux barriers 31 and the flow path extending through the rotor core cooling holes 35, the first gaps 44, and the radially-outer-side flux barriers 33 are independent flow paths. Thus, the cooling oil 9 flows along the three wall surfaces including the first outer wall surfaces 23a, the third outer wall surfaces 23c, and the fourth outer wall surfaces 23d of the permanent magnets 23. Therefore, a cooling area of the permanent magnets 23 is increased, and the permanent magnets 23 can be effectively cooled, thereby being capable of improving cooling performance for the permanent magnets 23. As a result, the amount of a rare earth element such as dysprosium can be reduced, thereby being capable of reducing cost for magnets.

Further, the cooling oil 9 is supplied from the communication path 38 formed in the counter-load-side end plate 25 to the radially-inner-side flux barriers 31 and the rotor core cooling holes 35 arranged along the magnet accommodating holes 30, and hence a rotor core holding portion, which has hitherto been required, is unnecessary. As a result, the rotating electric machine 100 can be applied also to applications involving use of the radially inner portion of the rotor core 22.

The rotor core cooling hole 35 is formed by causing the radially-inner-side end portion and a vicinity thereof of the first inner wall surface 30a of the magnet accommodating hole 30 to protrude in a direction away from the second inner wall surface 30b. Therefore, the cooling oil 9 can flow along substantially entire surfaces of the first outer wall surfaces 23a of the permanent magnets 23, and the permanent magnets 23 can be effectively cooled.

A hole shape including the magnet accommodating hole 30, the radially-inner-side flux barrier 31, the radially-outer-side flux barrier 33, and the rotor core cooling hole 35 is constant along the axial direction. Therefore, when the magnetic thin plates punched out from the magnetic steel sheets are laminated to form the rotor core 22, only one type of a shape of the magnetic thin plates punched out from the electromagnetic steel sheets is required, thereby being capable of reducing a machining cost for the rotor core 22.

In the first embodiment described above, the flow path is formed by the rotor core cooling holes 35, the first gaps 44, and the radially-outer-side flux barriers 33, and the cooling oil 9 flows along the two wall surfaces including the first outer wall surfaces 23a and the third outer wall surfaces 23c of the permanent magnets 23. Thus, the cooling area of the permanent magnets 23 can be increased, and sufficient cooling performance for the permanent magnets 23 can be obtained, and hence the flow of the cooling oil 9 through the radially-inner-side flux barriers 31 may be omitted. In this case, simplification of the communication path 38 and the discharge path 39 is achieved, thereby being capable of reducing a machining cost for the counter-load-side end plate 25 and the load-side end plate 24.

Further, in the first embodiment described above, the discharge path 39 is formed so as to allow the radially-outer-side flux barriers 33 to communicate with the radially-outer-side of the load-side end plate 24, and to allow the radially-inner-side flux barriers 31 to communicate with the radially outer side of the load-side end plate 24, but the discharge path 39 may be formed so as to allow the radially-outer-side flux barriers 33 to communicate with an axially outer side of the load-side end plate 24, and to allow the radially-inner-side flux barriers 31 to communicate with the axially outer side of the load-side end plate 24.

Further, in the first embodiment described above, the communication path 38 is formed so as to supply the cooling oil 9 to the radially-inner-side flux barriers 31 and the rotor core cooling holes 35, but the communication path 38 may further be opened to an outside of the counter-load-side end plate 25, for example, toward a radially outer side. With this configuration, the cooling oil 9 is scattered from the communication path 38 by the centrifugal force, and hence the counter-load-side coil ends of the stator coils 12 can be cooled.

Second Embodiment

Figure 3:
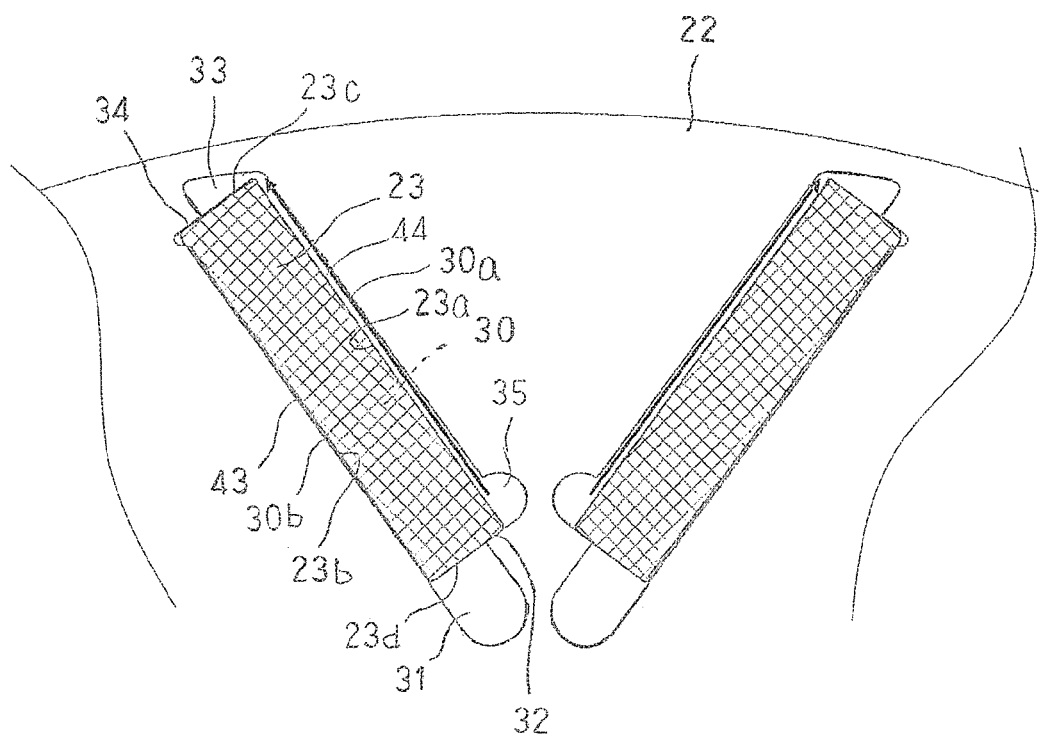
FIG. 3 is a transverse sectional view for illustrating main portions of magnet accommodating holes and a periphery thereof of a rotor core in a rotating electric machine according to a second embodiment of the present invention.

FIG. 3 is a transverse sectional view for illustrating main portions of magnet accommodating holes and a periphery thereof of a rotor core in a rotating electric machine according to a second embodiment of the present invention. In FIG. 3, arrows indicate flows of cooling oil. In FIG. 3, only a part corresponding to one pole is illustrated.

In FIG. 3, a pair of magnet accommodating holes 30 are arranged in a V-shape arrangement in plane symmetry with respect to a plane including the axial center of the shaft 21, in which first inner wall surfaces 30a face each other, and a distance therebetween gradually increases toward a radially outer side. A radially-inner-side flux barrier 31 is formed so as to be continuous to a radially inner side of a second inner wall surface 30b of the magnet accommodating hole 30 in the length direction and penetrate a rotor core 22 in the axial direction. A radially-inner-side magnet holding portion 32 is formed so as to protrude toward the second inner wall surface 30b side at a radially-inner-side end portion of the first inner wall surface 30a of the magnet accommodating hole 30.

A radially-outer-side flux barrier 33 forming a radially-outer-side refrigerant flow path is formed so as to be continuous to a radially outer side of the first inner wall surface 30a of the magnet accommodating hole 30 in the length direction and penetrate the rotor core 22 in the axial direction. The radially-outer-side magnet holding portion 34 is formed so as to protrude toward the first inner wall surface 30a side at a radially-outer-side end portion of the second inner wall surface 30b of the magnet accommodating hole 30.

A rotor core cooling hole 35 is formed by causing a radially-inner-side end portion and a vicinity thereof of the first inner wall surface 30a of the magnet accommodating hole 30 to protrude in a direction away from the second inner wall surface 30b.

The radially-inner-side flux barriers 31, the radially-outer-side flux barriers 33, and the rotor core cooling holes 35, which communicate with the magnet accommodating holes 30 arranged in the V-shape arrangement, are also in plane symmetry with respect to the plane including the axial center of the shaft 21.

The permanent magnets 23 are accommodated in the pair of magnet accommodating holes 30, in which the first outer wall surfaces 23a face the first inner wall surfaces 30a, and the third outer wall surfaces 23c are oriented radially outward. Under a state in which the third outer wall surface 23c and the fourth outer wall surface 23d are in contact with the radially-outer-side magnet holding portion 34 and the radially-inner-side magnet holding portion 32 so that movement of the permanent magnet 23 is restricted in the length direction of the second inner wall surface 30b, the second outer wall surface 23b is fixed to the second inner wall surface 30b with an adhesive 43. The first gap 44 is defined between the first inner wall surface 30a of the magnet accommodating hole 30 and the first outer wall surface 23a of the permanent magnet 23. The radially-outer-side flux barrier 33 and the rotor core cooling hole 35 communicate with each other through the first gap 44.

Other configurations are similar to those of the first embodiment described above.

Also in the second embodiment, the radially-inner-side flux barriers 31 and the rotor core cooling holes 35 are isolated from each other, and the flow path extending through the radially-inner-side flux barriers 31 and the flow path extending through the rotor core cooling holes 35, the first gaps 44, and the radially-outer-side flux barriers 33 are independent flow paths. Thus, the cooling oil 9 flows along the three wall surfaces including the first outer wall surfaces 23a, the third outer wall surfaces 23c, and the fourth outer wall surfaces 23d of the permanent magnets 23. Further, the rotor core cooling hole 35 is formed by causing the radially-inner-side end portion and a vicinity thereof of the first inner wall surface 30a of the magnet accommodating hole 30 to protrude in a direction away from the second inner wall surface 30b. In addition, a hole shape including the magnet accommodating hole 30, the radially-inner-side flux barrier 31, the radially-outer-side flux barrier 33, and the rotor core cooling hole 35 is constant along the axial direction. Therefore, also in the second embodiment, an effect similar to that of the first embodiment can be attained.

Third Embodiment

Figure 4:
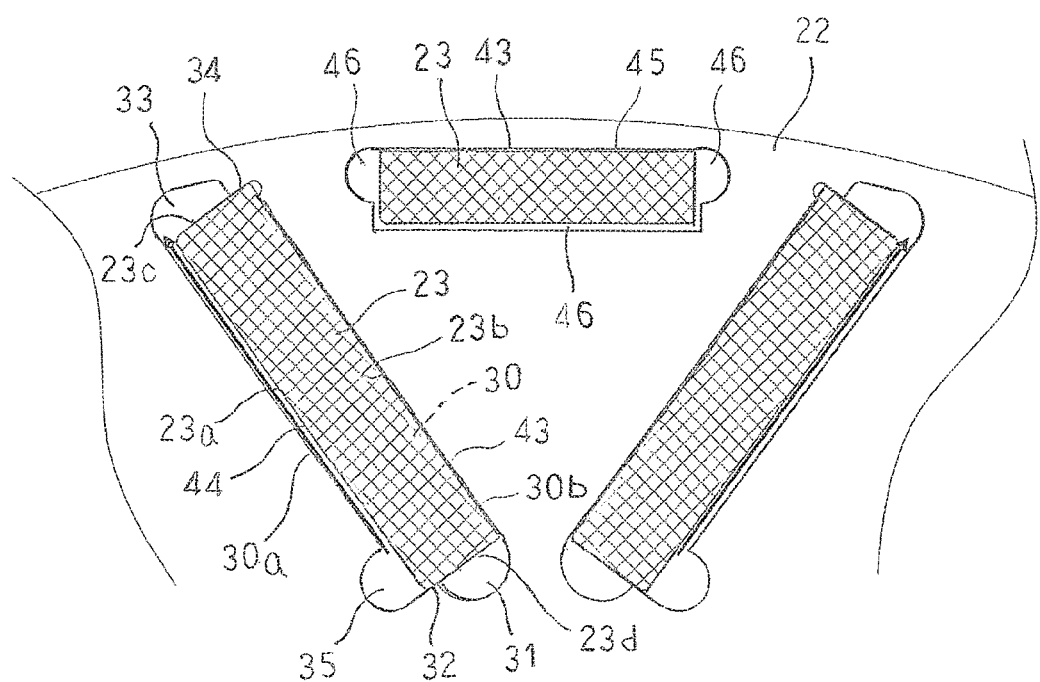
FIG. 4 is a transverse sectional view for illustrating main portions of magnet accommodating holes and a periphery thereof of a rotor core in a rotating electric machine according to a third embodiment of the present invention.

FIG. 4 is a transverse sectional view for illustrating main portions of magnet accommodating holes and a periphery thereof of a rotor core in a rotating electric machine according to a third embodiment of the present invention. In FIG. 4, arrows indicate flows of cooling oil. In FIG. 4, only a part corresponding to one pole is illustrated.

In FIG. 4, a magnet accommodating hole 45 having a hole shape of a rectangular cross-section is formed so as to penetrate the rotor core 22 in the axial direction, with wall surfaces formed by long sides of the rectangular cross-section being orthogonal to a plane including the axial center of the shaft. The magnet accommodating hole 45 is arranged at a center between each pair of magnet accommodating holes 30 arranged in the V-shape arrangement, and is arranged on the radially outer side in the rotor core 22. A pair of flux barriers 46 are formed by causing side walls, which are formed by short sides of the magnet accommodating hole 45 having the rectangular cross-section, to protrude outward in the length direction of the long sides of the magnet accommodating hole 45 having the rectangular cross-section. The permanent magnet 23 is inserted into the magnet accommodating hole 45, and is fixed with the adhesive 43 to the wall surface formed by the long side on the radially outer side of the magnet accommodating hole 45 having the rectangular cross-section. The permanent magnet 23 held in the magnet accommodating hole 45 is magnetized so that the polarity on the radially outer side thereof is set to the same polarity as the polarities of facing surfaces of the permanent magnets 23 arranged in the V-shape arrangement. Accordingly, one pole is formed by the three permanent magnets 23.

Other configurations are similar to those of the first embodiment described above.

In the third embodiment, the cooling structure for the permanent magnets 23 arranged in the V-shape arrangement is formed in a manner similar to that of the first embodiment described above. In addition, a hole shape including the magnet accommodating hole 30, 45, the radially-inner-side flux barrier 31, the radially-outer-side flux barrier 33, the rotor core cooling hole 35, and the flux barrier 46 is constant along the axial direction. Therefore, also in the third embodiment, an effect similar to that of the first embodiment can be attained.

Fourth Embodiment

Figure 5:
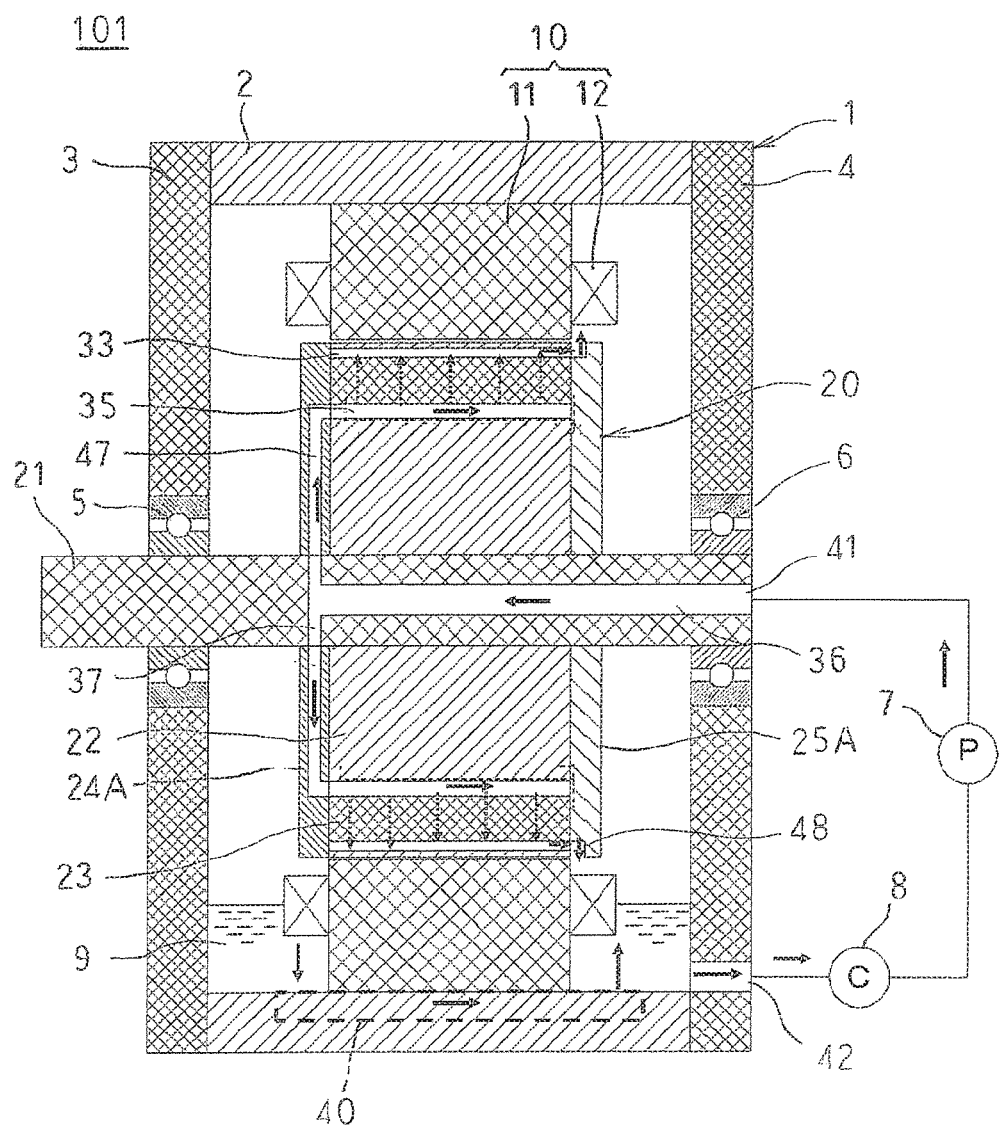
FIG. 5 is a longitudinal sectional view for illustrating a rotating electric machine according to a fourth embodiment of the present invention.
Figure 6:
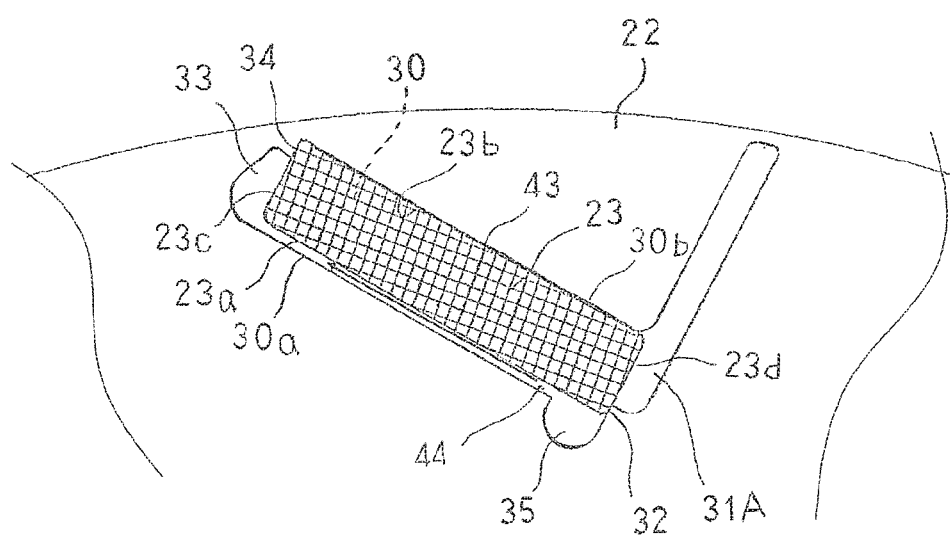
FIG. 6 is a transverse sectional view for illustrating main portions of a magnet accommodating hole and a periphery thereof of a rotor core in the rotating electric machine according to the fourth embodiment of the present invention.

FIG. 5 is a longitudinal sectional view for illustrating a rotating electric machine according to a fourth embodiment of the present invention. FIG. 6 is a transverse sectional view for illustrating main portions of a magnet accommodating hole and a periphery thereof of a rotor core in the rotating electric machine according to the fourth embodiment of the present invention. In FIG. 5 and FIG. 6, arrows indicate flows of cooling oil. In FIG. 6, only a part corresponding to one pole is illustrated.

In FIG. 6, a magnet accommodating hole 30 is formed in a rotor core 22, in which a second inner wall surface 30b is oriented radially outward, and a length direction of the second inner wall surface 30b is inclined in the circumferential direction with respect to the radial direction so as to penetrate the rotor core 22 in the axial direction with respective hole directions oriented in the axial direction. The magnet accommodating holes 30 are arrayed in the circumferential direction at constant pitches by the number of poles of the rotor 20.

The radially-inner-side flux barrier 31A is formed so as to be continuous to the radially inner side of the length direction of the second inner wall surface 30b of the magnet accommodating hole 30 and penetrate the rotor core 22 in the axial direction. Further, the radially-inner-side flux barrier 31A extends in a direction orthogonal to the second inner wall surface 30b and in a direction away from the first inner wall surface 30a. A radially-inner-side magnet holding portion 32 is formed so as to protrude toward the second inner wall surface 30b side at a radially-inner-side end portion of the first inner wall surface 30a of the magnet accommodating hole 30.

A radially-outer-side flux barrier 33 forming a radially-outer-side refrigerant flow path is formed so as to be continuous to a radially outer side of the second inner wall surface of the magnet accommodating hole 30 in the length direction and penetrate the rotor core 22 in the axial direction. The radially-outer-side magnet holding portion 34 is formed so as to protrude toward the first inner wall surface 30a side at a radially-outer-side end portion of the second inner wall surface 30b of the magnet accommodating hole 30.

A rotor core cooling hole 35 is formed by causing the radially-inner-side end portion and a vicinity thereof of the first inner wall surface 30a of the magnet accommodating hole 30 to protrude in a direction away from the second inner wall surface 30b.

The permanent magnet 23 is inserted into the magnet accommodating hole 30, and the second outer wall surface 23b is fixed to the second inner wall surface 30b with the adhesive 43 under a state in which the fourth outer wall surface 23d and the third outer wall surface 23c are in contact with the radially-inner-side magnet holding portion 32 and the radially-outer-side magnet holding portion 34. The first gap 44 is defined between the first inner wall surface 30a of the magnet accommodating hole 30 and the first outer wall surface 23a of the permanent magnet 23. The radially-outer-side flux barrier 33 and the rotor core cooling hole 35 communicate with each other through the first gap 44. Further, the radially-inner-side flux barrier 31A and the rotor core cooling hole 35 are isolated from each other.

In the permanent magnets 23 arrayed in the circumferential direction, directions orthogonal to the first outer wall surface 23a and the second outer wall surface 23b are defined as magnetization directions, and the permanent magnets are magnetized so that the polarities on the radially outer side are alternately changed in the circumferential direction. One permanent magnet 23 forms one pole.

In FIG. 5, a communication path 47 is formed so as to extend from an inner end surface of the load-side end plate 24A to the rotor core cooling holes 35, and further from the inner end surface of the load-side end plate 24A to the radially-inner-side flux barriers 31A. Openings of the radially-outer-side flux barriers 33 on the load side are closed by the load-side end plate 24A. Further, openings of the first gaps 44 on the load side allowing the radially-outer-side flux barriers 33 to communicate with the rotor core cooling holes 35 are closed by the load-side end plate 24A.

A discharge path 48 is formed so as to allow radially-outer-side flux barriers 33 to communicate with a radially outer side of the counter-load-side end plate 25A, and to allow the radially-inner-side flux barriers 31A to communicate with the radially outer side of the counter-load-side end plate 25A. Openings of the rotor core cooling holes 35 on the counter load side are closed by the counter-load-side end plate 25A. Further, openings of the first gaps 44 on the counter load side allowing the radially-outer-side flux barriers 33 to communicate with the rotor core cooling holes 35 are closed by the counter-load-side end plate 25A. Here, the load-side end plate 24A serves as the first end plate, and the counter-load-side end plate 25A serves as the second end plate.

A first shaft refrigerant path 36 is formed at the axial center position of the shaft 21 so as to extend from an end portion on the counter load side to an arrangement position of the load-side end plate 24A. A second shaft refrigerant path 37 is formed in the shaft 21 so as to be branched in radial directions being flow path directions from the first shaft refrigerant path 36 to extend to the communication path 47, respectively.

Other configurations are similar to those of the first embodiment described above.

Description is given of a method of cooling the permanent magnets 23 in a rotating electric machine 101 having the configuration described above.

The cooling oil 9 is pumped from the refrigerant supply port 41 to the first shaft refrigerant path 36 by an external pump 7 serving as a pressure source, and flows from the second shaft refrigerant path 37 into the communication path 47. A part of the cooling oil 9, which has flowed into the communication path 47, flows into the radially-inner-side flux barriers 31A, flows in the axial direction along the fourth outer wall surfaces 23d of the permanent magnets 23, and is discharged radially outward through the discharge path 48.

The remaining part of the cooling oil 9, which has flowed into the communication path 47, flows into the rotor core cooling holes 35 to flow through the rotor core cooling holes 35 in the axial direction. The openings of the rotor core cooling holes 35 on the counter load side are closed, and hence the cooling oil 9 flowing through the rotor core cooling holes 35 in the axial direction flows into the first gaps 44 by a pumping force of the pump 7 and a centrifugal force generated by rotations of the rotor 20. The cooling oil 9, which has flowed into the first gaps 44, flows along the first outer wall surfaces 23a of the permanent magnets 23 to flow into the radially-outer-side flux barriers 33. The cooling oil 9, which has flowed into the radially-outer-side flux barriers 33, flows along the third outer wall surfaces 23c of the permanent magnets 23 in the axial direction, and is discharged radially outward through the discharge path 48.

The cooling oil 9, which has been discharged from the discharge path 48, is scattered by the centrifugal force, and after cooling counter-load-side coil ends of the stator coil 12, is dropped to be accumulated on the lower end side in the inner space of the housing 1 in the vertical direction. The cooling oil 9 accumulated on the lower end side in the inner space of the housing 1 in the vertical direction is discharged from the refrigerant discharge port 42, and is returned to the pump 7 through an oil cooler 8. On this occasion, the cooling oil 9 accumulated on the load side of the stator 10 flows toward the counter load side of the stator 10 through the axial communication path 40.

Also in the fourth embodiment, the radially-inner-side flux barriers 31A and the rotor core cooling holes 35 are isolated from each other, and the flow path extending through the radially-inner-side flux barriers 31A and the flow path extending through the rotor core cooling holes 35, the first gaps 44, and the radially-outer-side flux barriers 33 are independent flow paths. Thus, the cooling oil 9 flows along the three wall surfaces including the first outer wall surfaces 23a, the third outer wall surfaces 23c, and the fourth outer wall surfaces 23d of the permanent magnets 23. Further, the rotor core cooling hole 35 is formed by causing the radially-inner-side end portion and a vicinity thereof of the first inner wall surface 30a of the magnet accommodating hole 30 to protrude in a direction opposite to the second inner wall surface 30b of the magnet accommodating hole 30. In addition, a hole shape including the magnet accommodating hole 30, the radially-inner-side flux barrier 31A, the radially-outer-side flux barrier 33, and the rotor core cooling hole 35 is constant along the axial direction. Therefore, also in the fourth embodiment, an effect similar to that of the first embodiment can be attained.

In the fourth embodiment described above, the second inner wall surface 30b, to which the permanent magnet 23 is firmly fixed, is the radially-outer-side inner wall surface of the magnet accommodating hole 30, but the second inner wall surface 30b, to which the permanent magnet 23 is firmly fixed, may be the radially-inner-side inner wall surface of the magnet accommodating hole 30. In this case, the radially-inner-side flux barrier 31A, the radially-inner-side magnet holding portion 32, the radially-outer-side flux barrier 33, the radially-outer-side magnet holding portion 34, and the rotor core cooling hole 35 are formed in a positional relationship similar to that of the second embodiment.

Further, in the fourth embodiment described above, the flow path is formed by the rotor core cooling holes 35, the first gaps 44, and radially-outer-side flux barriers 33, and the cooling oil 9 flows along the two wall surfaces including the first outer wall surfaces 23a and the third outer wall surfaces 23c of the permanent magnets 23. Thus, the cooling area of the permanent magnets 23 can be increased, and sufficient cooling performance for the permanent magnets 23 can be obtained, and hence the flow of the cooling oil 9 through the radially-inner-side flux barriers 31A may be omitted.

Further, in the fourth embodiment described above, the discharge path 48 is formed so as to allow the radially-outer-side flux barriers 33 to communicate with the radially outer side of the counter-load-side end plate 25A, and to allow the radially-inner-side flux barriers 31A to communicate with the radially outer side of the counter-load-side end plate 25A, but the discharge path 48 may be formed so as to allow the radially-outer-side flux barriers 33 to communicate with an axially outer side of the counter-load-side end plate 25A, and to allow the radially-inner-side flux barriers 31A to communicate with the axially outer side of the counter-load-side end plate 25A.

Further, in the fourth embodiment described above, the communication path 47 is formed so as to supply the cooling oil 9 to the radially-inner-side flux barriers 31A and the rotor core cooling holes 35, but the communication path 47 may further be opened to an outside of the load-side end plate 24A, for example, to a radially outer side. With this configuration, the cooling oil 9 is scattered from the communication path 47 by the centrifugal force, and hence the counter-load-side coil ends of the stator coils 12 can be cooled.

Further, in the first embodiment to the fourth embodiment, the rotor core cooling hole 35 is formed at the radially-inner-side end portion of the first inner wall surface 30a of the magnet accommodating hole 30, but it is only required that the position of the rotor core cooling hole 35 to be formed be on the radially inner side with respect to center portion of the first wall surfaces 30a in the length direction.

Fifth Embodiment

Figure 7:
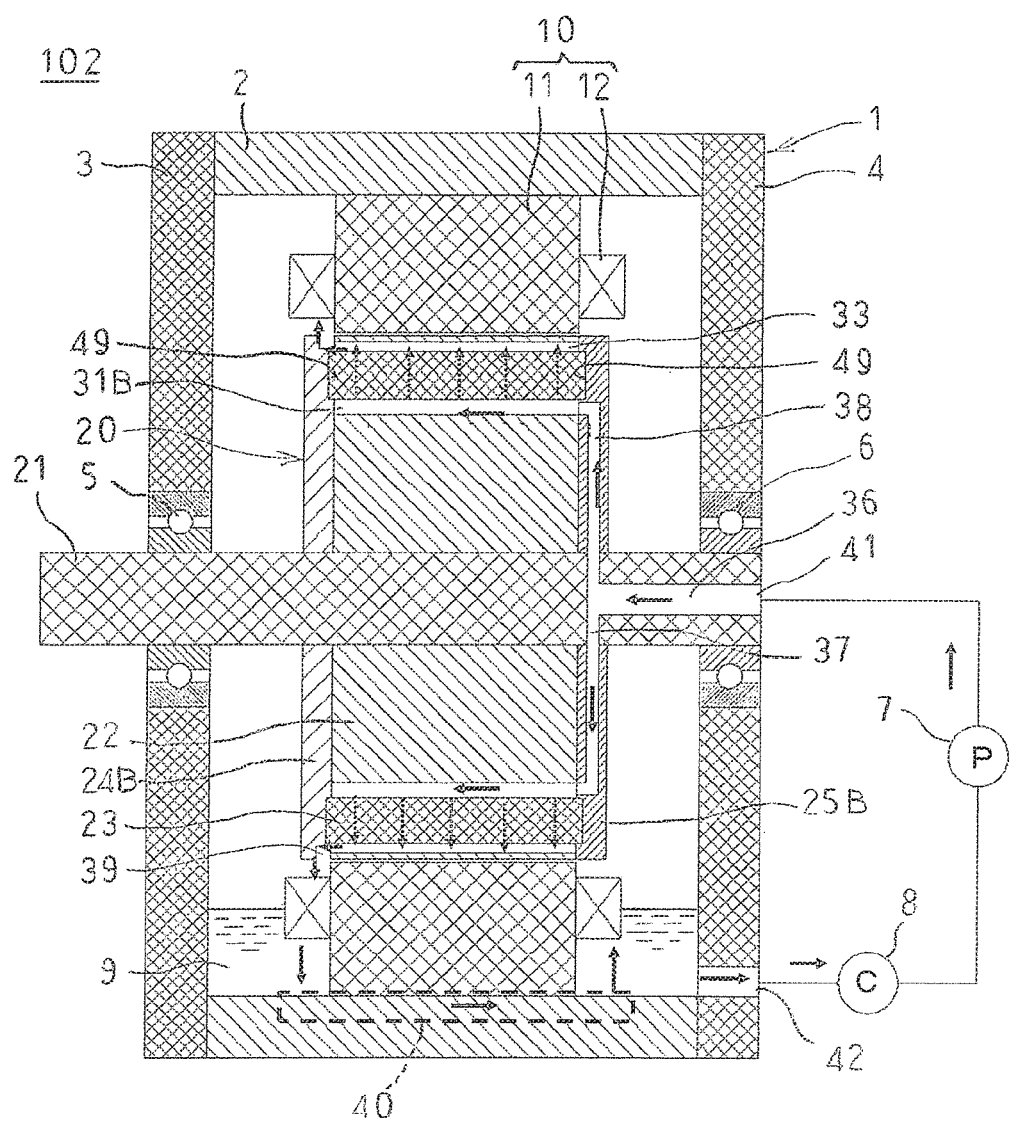
FIG. 7 is a longitudinal sectional view for illustrating a rotating electric machine according to a fifth embodiment of the present invention.
Figure 8:
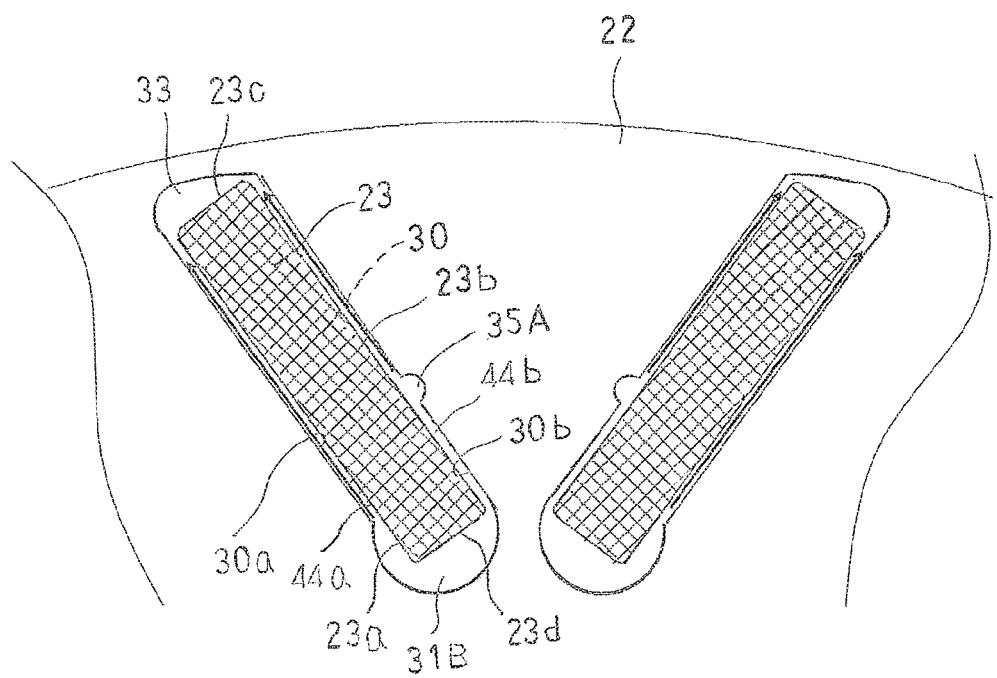
FIG. 8 is a transverse sectional view for illustrating main portions of magnet accommodating holes and a periphery thereof of a rotor core in the rotating electric machine according to the fifth embodiment of the present invention.

FIG. 7 is a longitudinal sectional view for illustrating a rotating electric machine according to a fifth embodiment of the present invention. FIG. 8 is a transvers sectional view for illustrating main portions of magnet accommodating hole and a periphery thereof of a rotor core in the rotating electric machine according to the fifth embodiment of the present invention. In FIG. 7 and FIG. 8, arrows indicate flows of cooling oil. In FIG. 8, only a part corresponding to one pole is illustrated.

In FIG. 8, two magnet accommodating holes 30 are arranged in a V-shape arrangement in plane symmetry with respect to a plane including the axial center of the shaft 21, in which the second inner wall surfaces 30b face each other, and a distance therebetween gradually increases toward the radially outer side. Thus, pairs of magnet accommodating holes 30 arranged in the V-shape arrangement are arrayed in a circumferential direction at constant pitches by the number of poles of the rotor 20. On this occasion, the length direction of the second inner wall surfaces 30b of the pair of magnet accommodating holes 30 are inclined toward opposite sides in the circumferential direction with respect to a radial direction.

A radially-inner-side flux barrier 31B is formed so as to be continuous to the radially inner side of the second inner wall surfaces 30b of the magnet accommodating holes 30 in the length direction and penetrate the rotor core 22 in the axial direction. Further, the radially-inner-side flux barrier 31B is formed so as to penetrate the rotor core in the axial direction by causing the radially-inner-side end portion and a vicinity thereof of the first inner wall surface 30a to protrude toward a side opposite to the second inner wall surfaces 30b. Here, the radially-inner-side flux barrier 31B also serves as first rotor core cooling holes.

The radially-outer-side flux barriers 33 forming a radially-outer-side refrigerant flow path is formed so as to be continuous to a radially outer side of the first inner wall surface 30a of the magnet accommodating hole 30 in the length direction and penetrate the rotor core 22 in the axial direction. The rotor core cooling hole 35A is formed so as to penetrate the rotor core 22 in the axial direction by causing a portion on the radially inner side with respect to the center portion of the second inner wall surface 30b of the magnet accommodating hole 30 in the length direction to protrude toward a side opposite to the first inner wall surface.

The radially-inner-side flux barriers 31B, the radially-outer-side flux barriers 33, and the rotor core cooling hole 35A, which communicate with the magnet accommodating holes 30 arranged in the V-shape arrangement, are also in plane symmetry with respect to the plane including the axial center of the shaft 21.

As illustrated in FIG. 7, the counter-load-side end plate 25B is recessed at positions facing the magnet accommodating holes 30 on the rotor core 22 side of to form a magnet holding groove 49. The communication path 38 is formed in the counter-load-side end plate 25B so as to allow the second shaft refrigerant path 37 to communicate with the rotor core cooling holes 35A, and to allow the second shaft refrigerant path 37 to communicate with the radially-inner-side flux barriers 31B.

The load-side end plate 24B is recessed at positions facing the magnet accommodating holes 30 on the rotor core 22 side to form the magnet holding groove 49. The discharge path 39 is formed so as to allow the radially-outer-side flux barriers 33 to communicate with the radially outer side of the load-side end plate 24, and to allow the radially-inner-side flux barriers 31B to communicate with the radially outer side of the load-side end plate 24B.

The permanent magnets 23 are inserted into the magnet accommodating holes 30 under a state in which both the end portions thereof are held in the magnet holding grooves 49 formed in the load-side end plate 24B and the counter-load-side end plate 25B. The first gaps 44a are defined between the first inner wall surfaces 30a of the magnet accommodating holes 30 and the first outer wall surfaces 23a of the permanent magnets 23. Second gaps 44b are defined between the second inner wall surfaces 30b of the magnet accommodating holes 30 and the second outer wall surfaces 23b of the permanent magnets 23. The radially-outer-side flux barriers 33, the radially-inner-side flux barriers 31B, and the rotor core cooling holes 35A communicate through the first gaps 44a and the second gaps 44b.

The openings of the radially-outer-side flux barriers 33 on the counter load side are closed by the counter-load-side end plate 25B. The openings of the radially-inner-side flux barriers 31B and the rotor core cooling holes 35A on the load side are closed by the load-side end plate 24B. Further, the openings of the first gaps 44a and the second gaps 44b on the load side and the counter load side are closed by the load-side end plate 24B and the counter-load-side end plate 25B.

Other configurations are similar to those of the first embodiment described above.

Description is given of a method of cooling the permanent magnets 23 in the rotating electric machine 102 having the configuration described above.

The cooling oil 9 is pumped from the refrigerant supply port 41 to the first shaft refrigerant path 36 by an external pump 7, and flows from the second shaft refrigerant path 37 into the communication path 38. A part of the cooling oil 9, which has flowed into the communication path 38, flows into the radially-inner-side flux barriers 31B, and flows in the axial direction along the radially inner side of the first outer wall surfaces 23a and the fourth outer wall surfaces 23d of the permanent magnets 23. The openings of the radially-inner-side flux barriers 31B on the load side are closed, and hence a part of the cooling oil 9 flowing in the radially-inner-side flux barriers 31B in the axial direction flows into the first gaps 44a by the pumping force of the pump 7 and the centrifugal force generated by rotations of the rotor 20. The cooling oil 9, which has flowed into the first gaps 44a, flows along the first outer wall surfaces 23a of the permanent magnets 23, and flows into the radially-outer-side flux barriers 33.

The remaining part of the cooling oil 9 flowing in the radially-inner-side flux barriers 31B in the axial direction flows into the second gaps 44b by the pumping force of the pump 7 and the centrifugal force generated by rotations of the rotor 20.

The remaining part of the cooling oil 9, which has flowed into the communication path 38, flows into the rotor core cooling holes 35A to flow through the rotor core cooling holes 35A in the axial direction. The openings of the rotor core cooling holes 35A on the load side are closed, and hence the cooling oil 9 flowing through the rotor core cooling holes 35A in the axial direction flows into the second gaps 44b by the pumping force of the pump 7 and the centrifugal force generated by rotations of the rotor 20. The cooling oil 9, which has flowed from the rotor core cooling holes 35A into the second gaps 44b, is merged with the cooling oil 9, which has flowed from the radially-inner-side flux barriers 31B into the second gaps 44b, and flows along the second outer wall surfaces 23b of the permanent magnets 23 to flow into the radially-outer-side flux barriers 33.

The cooling oil 9, which has flowed into the radially-outer-side flux barriers 33 through the first gaps 44a, is merged with the cooling oil 9, which has flowed into the radially-outer-side flux barriers 33 through the second gaps 44b, and flows along the third outer wall surfaces 23c of the permanent magnets 23 in the axial direction to be discharged radially outward from the discharge path 39.

The cooling oil 9, which has been discharged from the discharge path 39, is scattered by the centrifugal force, and after cooling load-side coil ends of the stator coil 12, is dropped to be accumulated on the lower end side in the inner space of the housing 1 in the vertical direction. The cooling oil 9 accumulated on the lower end side in the inner space of the housing 1 in the vertical direction is discharged from the refrigerant discharge port 42, and is returned to the pump 7 through an oil cooler 8. On this occasion, the cooling oil 9 accumulated on the load side of the stator 10 flows toward the counter load side of the stator 10 through the axial communication path 40.

According to the fifth embodiment, the flow path extending through the radially-inner-side flux barriers 31B, the flow path extending through the rotor core cooling holes 35A, the flow path extending through the first and the second gaps 44a and 44b, and the flow path extending through the radially-outer-side flux barriers 33 are formed. Therefore, the cooling oil 9 flows along the four wall surfaces formed by the four sides of the permanent magnets 23 having the rectangular cross-section, and the cooling area of the permanent magnets 23 is increased, thereby being capable of improving the cooling performance for the permanent magnets 23.

A hole shape including the magnet accommodating hole 30, the radially-inner-side flux barrier 31B, the radially-outer-side flux barrier 33, and the rotor core cooling hole 35A is constant along the axial direction. Therefore, when the magnetic thin plates punched out from the magnetic steel sheets are laminated to form the rotor core 22, only one type of a shape of the magnetic thin plates punched out from the electromagnetic steel sheets is required, thereby being capable of reducing a machining cost for the rotor core 22.

In the fifth embodiment, the cooling oil 9 is supplied from the rotor core cooling holes 35A to the second gaps 44b. However, the cooling oil 9 is supplied from the radially-inner-side flux barriers 31B to the second gaps 44b, and hence the rotor core cooling holes 35A may be omitted.

Further, in the fifth embodiment described above, the discharge path 48 is formed so as to allow the radially-outer-side flux barriers 33 to communicate with the radially outer side of the load-side end plate 24B, but the discharge path 48 may be formed so as to allow the radially-outer-side flux barriers 33 to communicate with an axially outer side of the load-side end plate 24B.

Further, in the fifth embodiment described above, the communication path 38 is formed so as to supply the cooling oil 9 to the radially-inner-side flux barriers 31B and the rotor core cooling holes 35A, but the communication path 38 may further be opened to an outside of the counter-load-side end plate 25B, for example, toward a radially outer side. With this configuration, the cooling oil 9 is scattered from the communication path 38 by the centrifugal force, and hence the counter-load-side coil ends of the stator coil 12 can be cooled.

Further, in the fifth embodiment described above, the permanent magnets 23 are held at both end portions thereof in the magnet holding groove 49 formed in the load-side end plate 24B and the counter-load-side end plate 25b, but a structure in which the second outer wall surfaces 23b are fixed to the second inner wall surfaces 30b with the adhesive 43, may be combined.

Sixth Embodiment

Figure 9:
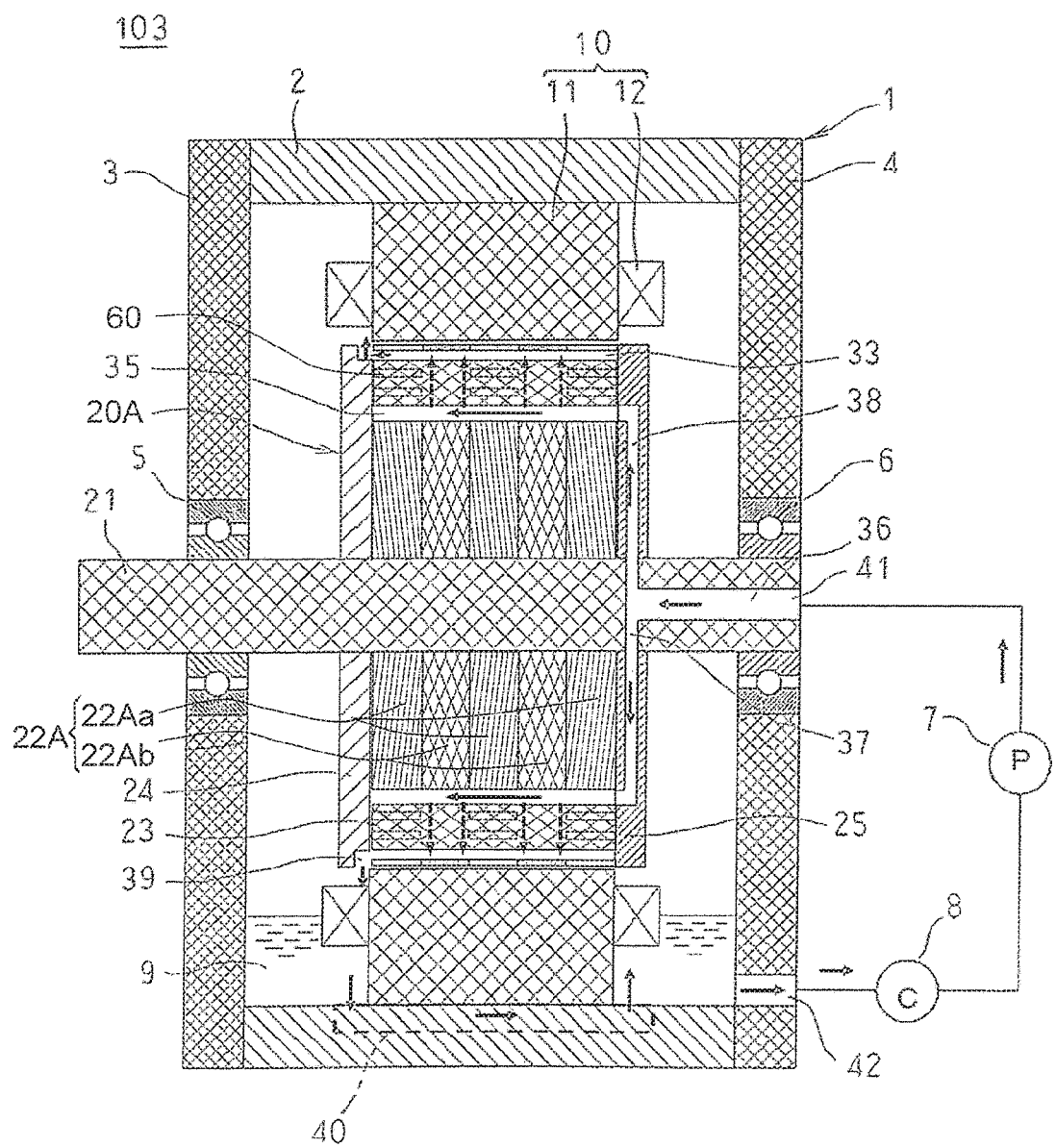
FIG. 9 is a longitudinal sectional view for illustrating a rotating electric machine according to a sixth embodiment of the present invention.
Figure 10:
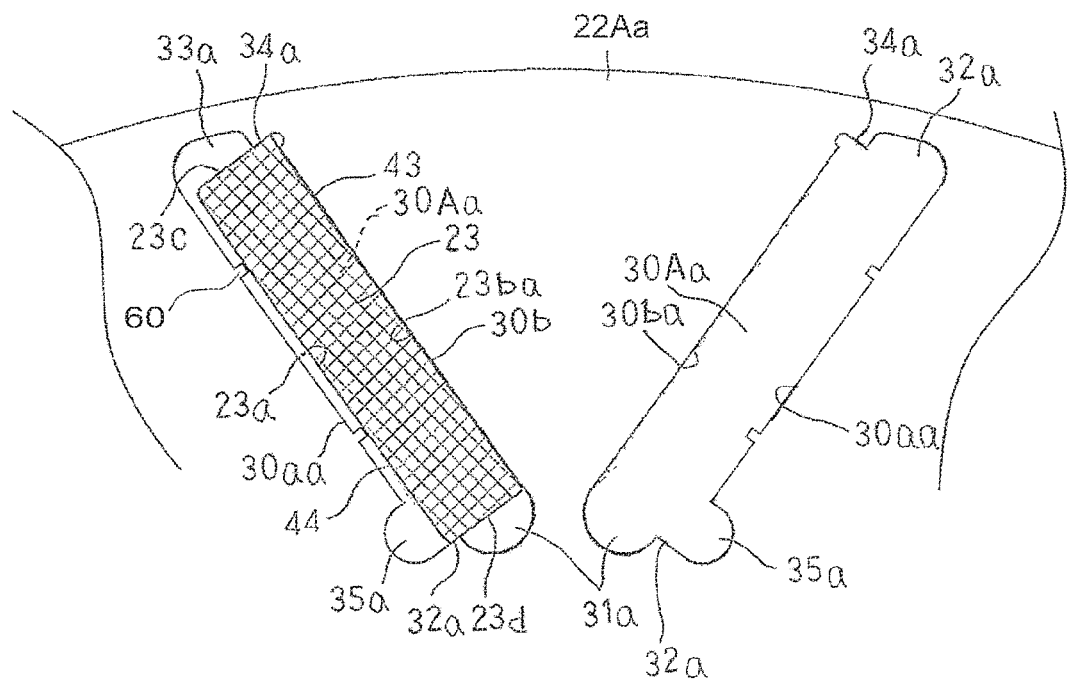
FIG. 10 is a transverse sectional view for illustrating main portions of magnet accommodating holes and a periphery thereof of a first rotor core forming a rotor core in the rotating electric machine according to the sixth embodiment of the present invention.
Figure 11:
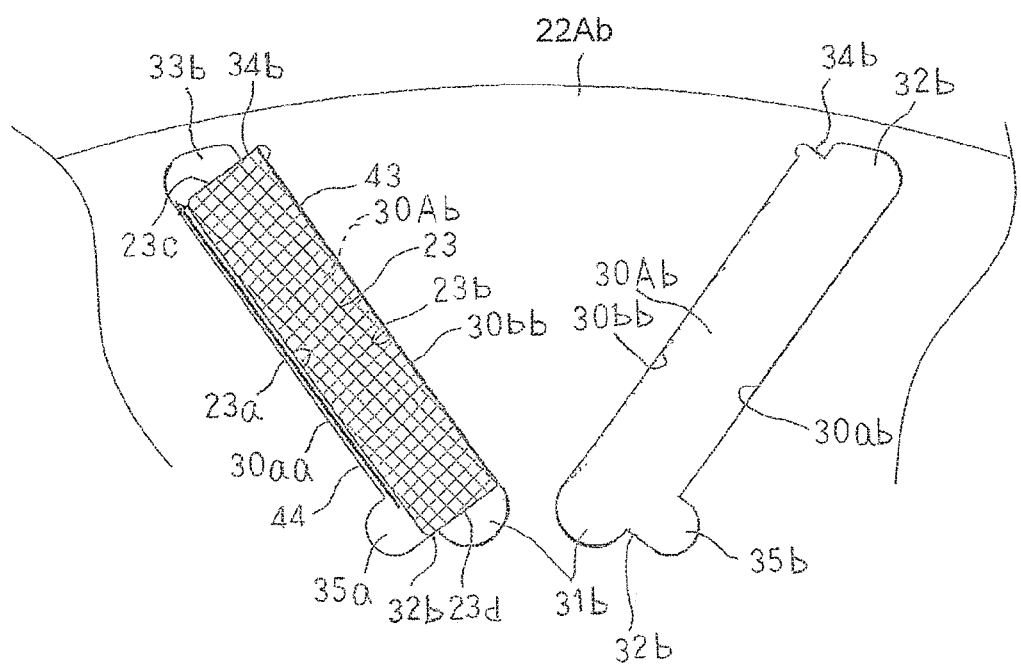
FIG. 11 is a transverse sectional view for illustrating main portions of magnet accommodating holes and a periphery thereof of a second rotor core forming the rotor core in the rotating electric machine according to the sixth embodiment of the present invention.

FIG. 9 is a longitudinal sectional view for illustrating a rotating electric machine according to a sixth embodiment of the present invention. FIG. 10 is a transverse sectional view for illustrating main portions of magnet accommodating holes and a periphery thereof of a first rotor core forming a rotor core in the rotating electric machine according to the sixth embodiment of the present invention. FIG. 11 is a transverse sectional view for illustrating main portions of magnet accommodating holes and a periphery thereof of a second rotor core forming the rotor core in the rotating electric machine according to the sixth embodiment of the present invention. Arrows illustrated in FIG. 9 and FIG. 11 indicate flows of a refrigerant. In FIG. 10 and FIG. 11, only a part corresponding to one pole is illustrated. In FIG. 10 and FIG. 11, for convenience of description, one of permanent magnets is omitted.

In FIG. 9, a rotor core 22A includes three first rotor cores 22Aa and two second rotor cores 22Ab, and has a configuration in which the first rotor cores 22Aa and the second rotor cores 22Ab are in contact with each other in the axial direction and are arranged alternately. The first rotor cores 22Aa and the second rotor cores 22Ab are each formed by the laminating magnetic thin plates punched out from magnetic steel sheets. That is, the rotor core 22A is formed of two types of magnetic thin plates laminated in the axial direction.

As illustrated in FIG. 10, first magnet accommodating holes 30Aa each have a first inner wall surface 30aa and a second inner wall surface 30ba facing each other in parallel, and are formed so as to penetrate the first rotor core 22Aa in the axial direction with respective hole directions oriented in the axial direction. Protrusions 60 extending in the axial direction are arranged in two rows so as to be isolated in the radial direction in the first inner wall surface 30aa of the first magnet accommodating hole 30Aa. The axial length of the protrusion 60 is shorter than the axial length of the first rotor core 22Aa. Both the axial ends of the protrusion 60 are positioned axially inward with respect to both the axial ends of the first rotor core Aa. The two first magnet accommodating holes 30Aa are arranged in a V-shape arrangement in plane symmetry with respect to a plane including the axial center of the shaft 21, in which the second-inner-wall surfaces 30ba face each other, and a distance therebetween gradually increases toward the radially outer side. In such a manner, the pairs of first magnet accommodating holes 30Aa arranged in the V-shape arrangement are arrayed at constant pitches in the circumferential direction by the number of poles of the rotor 20A.

A first radially-inner-side flux barrier 31a is formed so as to be continuous to a radially inner side of the second inner wall surface 30ba of the first magnet accommodating hole 30Aa in the length direction and penetrate the first rotor core 22Aa in the axial direction. A radially-inner-side magnet holding portion 32a is formed so as to protrude toward the second inner wall surface 30ba side at a radially-inner-side end portion of the first inner wall surface 30aa of the first magnet accommodating hole 30Aa.

A first radially-outer-side flux barrier 33a is formed so as to be continuous to a radially outer side of the first inner wall surface 30aa of the first magnet accommodating hole 30Aa in the length direction and penetrate the first rotor core 22Aa in the axial direction. A first radially-outer-side magnet holding portion 34a is formed so as to protrude toward the first inner wall surface 30aa side at a radially-outer-side end portion of the second inner wall surface 30ba of the first magnet accommodating hole 30Aa.

A first rotor core cooling hole 35a is formed by causing the radially-inner-side end portion and a vicinity thereof of the first inner wall surface 30aa of the first magnet accommodating hole 30Aa to protrude in a direction away from the second inner wall surface 30ba.

As illustrated in FIG. 11, second magnet accommodating holes 30Ab each have a first inner wall surface 30ab and a second inner wall surface 30bb facing each other in parallel, and are formed so as to penetrate the second rotor core 22Ab in the axial direction with respective hole directions oriented in the axial direction. The two second magnet accommodating holes 30Ab are arranged in a V-shape arrangement in plane symmetry with respect to a plane including the axial center of the shaft 21, in which the second inner wall surfaces 30bb face each other, and a distance therebetween gradually increases toward the radially outer side. Thus, pairs of second magnet accommodating holes 30Ab arranged in the V-shape arrangement are arrayed in a circumferential direction at constant pitches by the number of poles of the rotor 20.

The first radially-inner-side flux barriers 31a is formed so as to be continuous to the radially inner side in the length direction of the second inner wall surface 30bb of the second magnet accommodating hole 30Ab and penetrate the second rotor core 22Ab in the axial direction. A radially-inner-side magnet holding portion 32b is formed so as to protrude toward the second inner wall surface 30bb side at a radially-inner-side end portion of the first inner wall surface 30ab of the second magnet accommodating hole 30Ab.

A second radially-outer-side flux barriers 33b is formed so as to be continuous to the radially outer side of the first inner wall surface 30aa of the second magnet accommodating hole 30Ab in the length direction and penetrate the second rotor core 22Ab in the axial direction. A second radially-outer-side magnet holding portion 34b is formed so as to protrude toward the first inner wall surface 30ab side at a radially-outer-side end portion of the second inner wall surface 30bb of the second magnet accommodating hole 30Ab.

A second rotor core cooling hole 35b is formed by causing the radially-inner-side end portion and a vicinity thereof of the first inner wall surface 30ab of the second magnet accommodating hole 30Ab to protrude in a direction away from the second inner wall surface 30bb.

The first rotor core 22Aa is formed so as to have the same shape as the second rotor core 22Ab except that the protrusions 60 are formed. In the rotor core 22A, the magnet accommodating holes are formed by the first magnet accommodating holes 30Aa and the second magnet accommodating holes 30Ab so as to be continuous to each other in the axial direction. The radially-inner-side flux barriers are formed by the first radially-inner-side flux barriers 31a and the second radially-inner-side flux barriers 31b so as to be continuous to each other in the axial direction. The radially-inner-side magnet holding portions are formed by the first radially-inner-side magnet holding portions 32a and the second radially-inner-side magnet holding portions 32b so as to be continuous to each other in the axial direction. Radially outer side flux barriers 33 are formed by the first radially-outer-side flux barriers 33a and the second radially-outer-side flux barriers 33b so as to be continuous to each other in the axial direction. Radially outer side magnet holding portions are formed by the first radially-outer-side magnet holding portions 34a and the second radially-outer-side magnet holding portions 34b so as to be continuous to each other in the axial direction. The rotor core cooling holes 35 are formed by the first rotor core cooling holes 35a and the second rotor core cooling holes 35b so as to be continuous to each other in the axial direction.

The permanent magnets 23 are each formed into a rectangular parallelepiped having an axial length of the rotor core 22A. The permanent magnets 23 are accommodated in a pair of magnet accommodating holes, in which the first outer wall surfaces 23a face the first inner wall surfaces 30aa and 30ab, and the third outer wall surfaces 23c are oriented radially outward. Under a state in which the third outer wall surface 23c and the fourth outer wall surface 23d are in contact with the first radially-outer-side magnet holding portion 34a and the second radially-inner-side magnet holding portion 32b so that movement of the permanent magnet 23 is restricted in the length direction of the second inner wall surface 30ba and 30bb, and the second outer wall surface 23b is fixed to the second inner wall surface 30ba with the protrusion 60. First gaps 44 are defined between the first inner wall surfaces 30aa and 30ab of the magnet accommodating holes 30 and the first outer wall surfaces 23a of the permanent magnets 23. The radially-outer-side flux barriers 33 and the rotor core cooling holes 35 communicate with each other through the first gaps 44.

Other configurations are similar to those of the first embodiment described above.

Description is given of a method of cooling the permanent magnets 23 in the rotating electric machine 103 having the configuration described above with reference to FIG. 9 to FIG. 11.

The cooling oil 9 is pumped from the refrigerant supply port 41 to the first shaft refrigerant path 36 by an external pump 7 serving as a pressure source, and flows from the second shaft refrigerant path 37 into the communication path 38. A part of the cooling oil 9, which has flowed into the communication path 38, flows into the radially-inner-side flux barriers, flows in the axial direction along the fourth outer wall surfaces 23d of the permanent magnets 23, and is discharged radially outward through the discharge path 39.

The remaining part of the cooling oil 9, which has flowed into the communication path 38, flows into the rotor core cooling holes 35 to flow through the rotor core cooling holes 35 in the axial direction. The openings of the rotor core cooling holes 35 on the load side are closed, and hence the cooling oil 9 flowing through the rotor core cooling holes 35 in the axial direction flows into the first gaps 44, which are defined between the first magnet accommodating holes 30Aa and the second magnet accommodating holes 30Ab, by a pumping force of the pump 7 and a centrifugal force generated by rotations of the rotor 20A.

The cooling oil 9, which has flowed into the first gaps 44 of the second magnet accommodating holes 30Ab, flows along the first outer wall surfaces 23a of the permanent magnets 23 to flow into the radially-outer-side flux barriers 33. The cooling oil 9, which has flowed into the radially-outer-side flux barriers 33, flows along the third outer wall surfaces 23c of the permanent magnets 23 in the axial direction, and is discharged radially outward through the discharge path 39. Meanwhile, the cooling oil 9, which has flowed in the first gaps 44 of the first magnet accommodating holes 30Aa, flows along the protrusions 60 in the axial direction, and is merged with the cooling oil 9 which flows into the first gaps 44 of the second magnet accommodating holes 30Ab to flow along the first outer wall surfaces 23a of the permanent magnets 23.

The cooling oil 9, which has been discharged from the discharge path 39, is scattered by the centrifugal force, and after cooling load-side coil ends of the stator coil 12, is dropped to be accumulated on the lower end side in the inner space of the housing 1 in the vertical direction. The cooling oil 9 accumulated on the lower end side in the inner space of the housing 1 in the vertical direction is discharged from the refrigerant discharge port 42, and is returned to the pump 7 through an oil cooler 8. On this occasion, the cooling oil 9 accumulated on the load side of the stator 10 flows toward the counter load side of the stator 10 through the axial communication path 40.

The path extending through the first radially-inner-side flux barriers 31a and the second radially-inner-side flux barriers 32b to the discharge path 39 and the path extending through the rotor core cooling holes 35, the first gaps 44, and the radially-outer-side flux barriers 33 to the discharge path 39 are independent of each other.

Therefore, also in the sixth embodiment, an effect similar to that of the first embodiment described above can be attained. According to the sixth embodiment, the second outer wall surfaces 23b of the permanent magnets 23 are fixed to the second inner wall surfaces 30ba by the protrusions 60, and the permanent magnets 23 are held in the magnet accommodating holes. Therefore, the adhesive 43 for fixing the permanent magnets 23 is unnecessary, thereby being capable of reducing the cost.

In the sixth embodiment, the protrusions 60 extending in the axial direction with the axial lengths of the first rotor cores 22Aa are arranged in two rows radially in the first inner wall surfaces 30aa, but the projections are only required to have a height with which the second outer wall surfaces 23b of the permanent magnets 23 can be fixed to the second inner wall surfaces 30ba. For example, a plurality of island-shaped protrusions may be arranged dispersely in the first inner wall surfaces 30aa.

Seventh Embodiment

Figure 12:
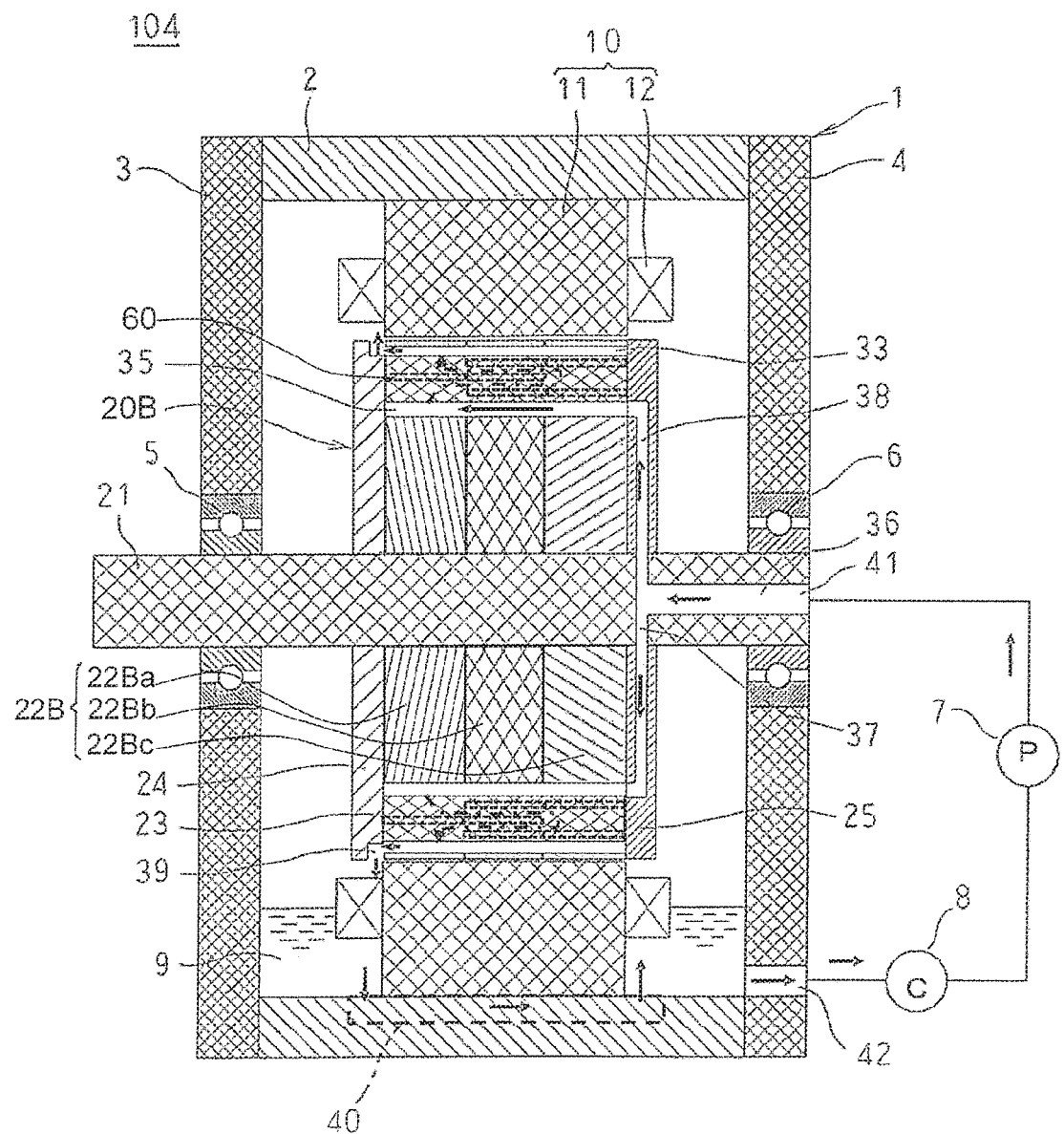
FIG. 12 is a longitudinal sectional view for illustrating a rotating electric machine according to a seventh embodiment of the present invention.
Figure 13:
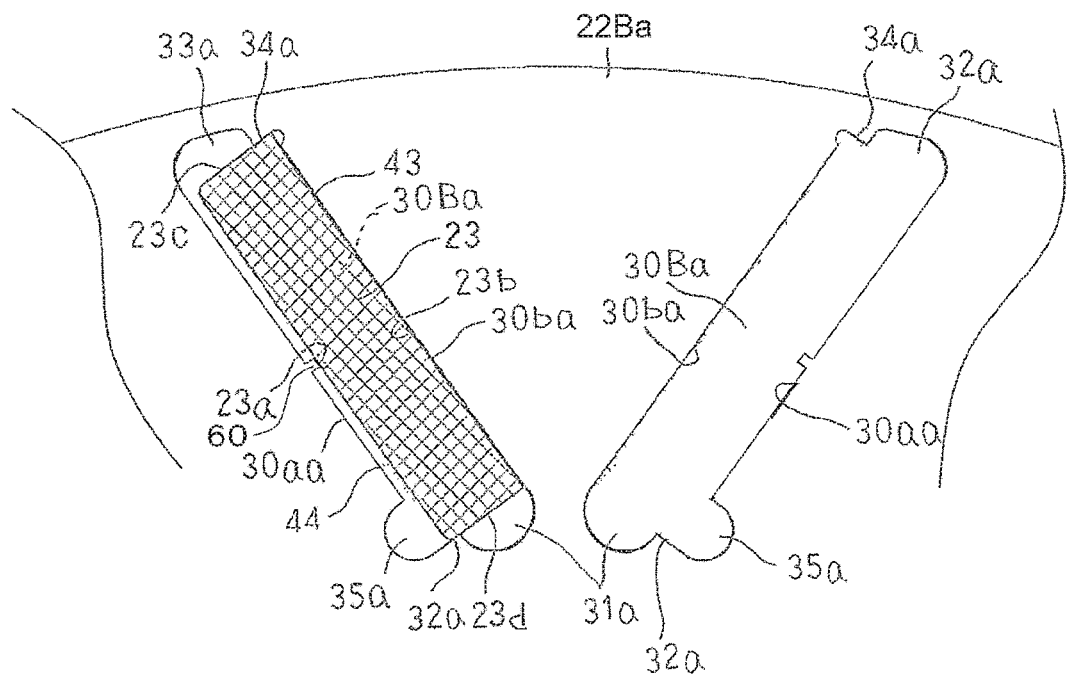
FIG. 13 is a transverse sectional view for illustrating main portions of magnet accommodating holes and a periphery thereof of a first rotor core forming a rotor core in the rotating electric machine according to the seventh embodiment of the present invention.
Figure 14:
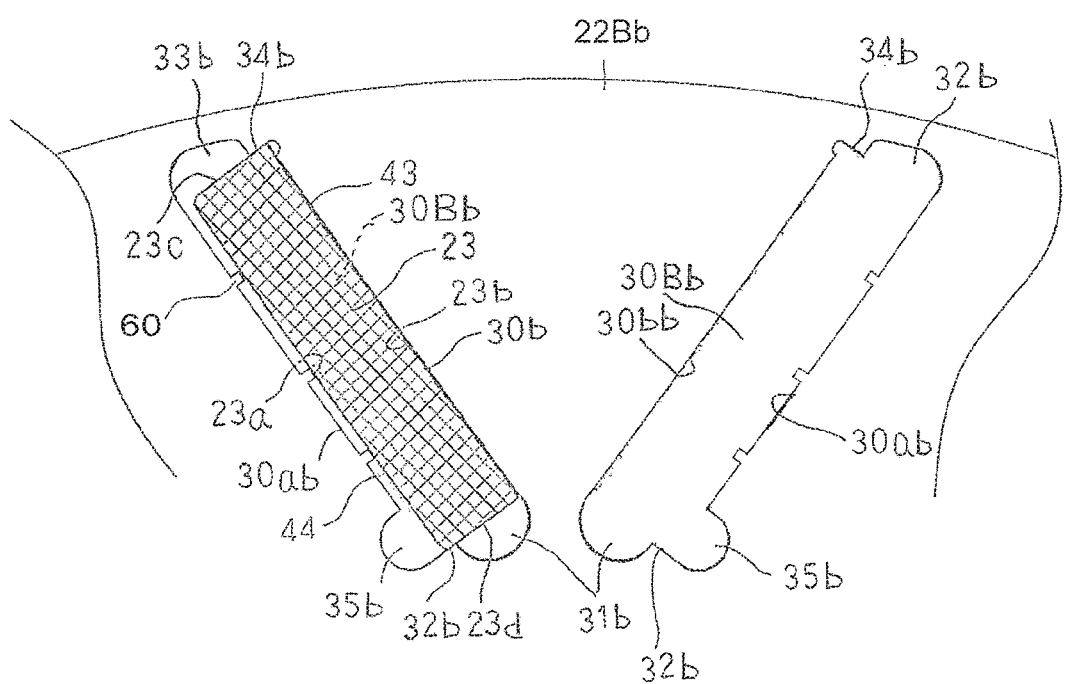
FIG. 14 is a transverse sectional view for illustrating main portions of magnet accommodating holes and a periphery thereof of a second rotor core forming the rotor core in the rotating electric machine according to the seventh embodiment of the present invention.
Figure 15:
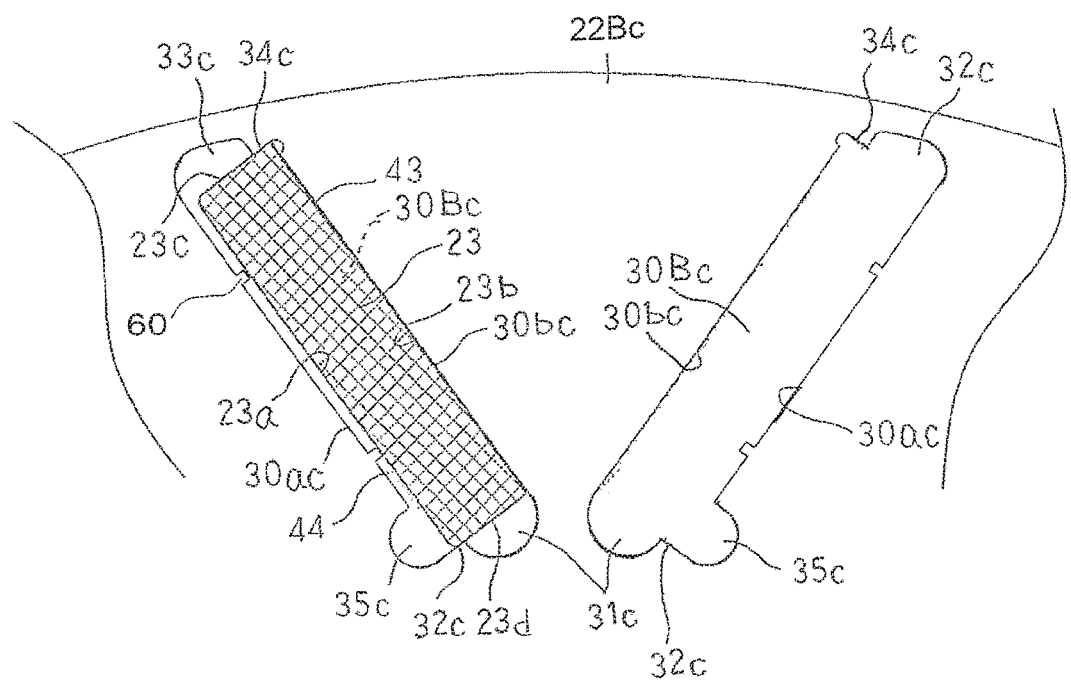
FIG. 15 is a transverse sectional view for illustrating main portions of magnet accommodating holes and a periphery thereof of a third rotor core forming the rotor core in the rotating electric machine according to the seventh embodiment of the present invention.

FIG. 12 is a longitudinal sectional view for illustrating a rotating electric machine according to a seventh embodiment of the present invention. FIG. 13 is a transverse sectional view for illustrating main portions of magnet accommodating holes and a periphery thereof of a first rotor core forming a rotor core of the rotating electric machine according to the seventh embodiment of the present invention. FIG. 14 is a transverse sectional view for illustrating main portions of magnet accommodating holes and a periphery thereof of a second rotor core forming the rotor core of the rotating electric machine according to the seventh embodiment of the present invention. FIG. 15 is a transverse sectional view for illustrating main portions of magnet accommodating holes and a periphery thereof of a third rotor core forming the rotor core of the rotating electric machine according to the seventh embodiment. Arrows illustrated in FIG. 12 indicate flows of a refrigerant. In FIG. 13 to FIG. 15, a part corresponding to only one magnetic pole is illustrated. In FIG. 13 to FIG. 15, for convenience of description, one of permanent magnets is omitted.

In FIG. 12, a rotor core 22B includes a first rotor core 22Ba, a second rotor core 22Bb, and a third rotor core 22Bc, and the first rotor core 22Ba, the second rotor core 22Bb, and the third rotor core 22Bc are arranged in the axial direction while being in contact with each other. The first rotor core 22Ba, the second rotor core 22Bb, and the third rotor core 22Bc are each formed of laminated magnetic thin plates punched out from magnetic steel sheets. That is, the rotor core 22B is formed of three types of magnetic thin plates laminated in the axial direction.

As illustrated in FIG. 13, first magnet accommodating holes 30Ba each have a first inner wall surface 30aa and a second inner wall surfaces 30ba facing each other in parallel, and are formed so as to penetrate the first rotor core 22Ba in the axial direction with respective hole directions oriented in the axial direction. The protrusions 60 extending in the axial direction are formed at centers in the length directions of the first inner wall surfaces 30aa of the first magnet accommodating holes 30Ba. The axial lengths of the protrusions 60 are the same lengths as the axial length of the first rotor core 22Ba. The two first magnet accommodating holes 30Ba are arranged in a V-shape arrangement in plane symmetry with respect to a plane including the axial center of the shaft 21, in which the second-inner-wall surfaces 30ba face with each other, and a distance therebetween gradually increases toward the radially outer side. In such a manner, the pairs of first magnet accommodating holes 30Ba arranged in the V-shape arrangement are arrayed at constant pitches in the circumferential direction by the number of poles of the rotor 20B.

A first radially-inner-side flux barrier 31a is formed so as to be continuous to a radially inner side of the second inner wall surface 30ba of the first magnet accommodating hole 30Ba in the length direction and penetrate the first rotor core 22Ba in the axial direction. A first radially-inner-side magnet holding portion 32a is formed so as to protrude toward the second inner wall surface 30ba side at a radially-inner-side end portion of the first inner wall surface 30aa of the first magnet accommodating hole 30Ba.

A first radially-outer-side flux barrier 33a is formed so as to be continuous to the radially outer side of the first inner wall surface 30aa of the first magnet accommodating hole 30Ba in the length direction and penetrate the first rotor core 22Ba in the axial direction. A first radially-outer-side magnet holding portion 34a is formed so as to protrude toward the first inner wall surface 30aa side at a radially-outer-side end portion of the second inner wall surface 30ba of the first magnet accommodating hole 30Ba.

A first rotor core cooling hole 35a is formed by causing the radially-inner-side end portion and a vicinity thereof of the first inner wall surface 30aa of the first magnet accommodating hole 30Ba to protrude in a direction away from the second inner wall surface 30ba.

As illustrated in FIG. 14, the second magnet accommodating holes 30Bb each have a first inner wall surface 30ab and a second inner wall surface 30bb facing each other in parallel, and are formed so as to penetrate the second rotor core 22Bb in the axial direction with respective hole directions oriented in the axial direction. The protrusions 60 extending in the axial direction are formed at three positions, which are a center, a radially inner side, and a radially outer side of the first inner wall surface 30ab of the second magnet accommodating hole 30Bb in the length direction. The axial lengths of the protrusions 60 are the same lengths as the axial length of the second rotor core 22Bb. The two second magnet accommodating holes 30Bb are arranged in the V-shape arrangement in plane symmetry with respect to a plane including the axial center of the shaft 21 similarly to the first magnet accommodating holes 30Ba. Thus, pairs of second magnet accommodating holes 30Bb arranged in the V-shape arrangement are arrayed at constant pitches in the circumferential direction by the number of poles of the rotor 20B.

The second radially-inner-side flux barriers 31b, the second radially-inner-side magnet holding portions 32b, the second radially-outer-side flux barriers 33b, the second radially-outer-side magnet holding portions 34b, and the second rotor core cooling holes 35b are formed in the second rotor core 22Bb similarly to the first radially-inner-side flux barriers 31a, the first radially-inner-side magnet holding portions 32a, the first radially-outer-side flux barriers 33a, the first radially-outer-side magnet holding portions 34a, and the first rotor core cooling holes 35a formed in the first rotor core 22Ba.

As illustrated in FIG. 15, third magnet accommodating holes 30Bc each have a first inner wall surface 30ac and a second inner wall surfaces 30bc facing each other in parallel, and are formed so as to penetrate the third rotor core 22Bc in the axial direction with respective hole directions oriented in the axial direction. The protrusions 60 extending in the axial direction are formed at two positions, which are a radially inner side and a radially outer sides of the first inner wall surface 30ac of the third magnet accommodating hole 30Bc in the length direction. The axial lengths of the protrusions 60 are the same lengths as the axial length of the third rotor core 22Bc. The two third magnet accommodating holes 30Bc are arranged in the V-shape arrangement in plane symmetry with respect to a plane including the axial center of the shaft 21 similarly to the first magnet accommodating holes 30Ba. Thus, pairs of third magnet accommodating holes 30Bc arranged in the V-shape arrangement are arrayed at constant pitches in the circumferential direction by the number of poles of the rotor 20C.

The third radially-inner-side flux barriers 31c, the third radially-inner-side magnet holding portions 32c, the third radially-outer-side flux barriers 33c, the third radially-outer-side magnet holding portions 34c, and the third rotor core cooling holes 35c are formed in the third rotor core 22Bc similarly to the first radially-inner-side flux barriers 31a, the first radially-inner-side magnet holding portions 32a, the first radially-outer-side flux barriers 33a, the first radially-outer-side magnet holding portions 34a, and the first rotor core cooling holes 35a formed in the first rotor core 22Ba.

The first rotor core 22Ba, the second rotor core 22Bb, and the third rotor core 22Bc are formed so as to have the same shape except that the number and the arrangement of the protrusions 60 are different. In the rotor core 22B, the first magnet accommodating holes 30Ba, the second magnet accommodating holes 30Bb, and the third magnet accommodating holes 30Bc are continuous in the axial direction to form the magnet accommodating holes. The first radially-inner-side flux barriers 31a, the second radially-inner-side flux barriers 31b, and the third radially-inner-side flux barriers 31c are continuous in the axial direction to form the radially-inner-side flux barriers. The first radially-inner-side magnet holding portions 32a, the second radially-inner-side magnet holding portions 32b, and the third radially-inner-side magnet holding portions 32c are continuous in the axial direction to form the radially-inner-side magnet holding portions. The first radially-outer-side flux barriers 33a, the second radially-outer-side flux barriers 33b, and the third radially-outer-side flux barriers 33c are continuous in the axial direction to form the radially-outer-side flux barrier 33. The first radially-outer-side magnet holding portions 34a, the second radially-outer-side magnet holding portions 34b, and the third radially-outer-side magnet holding portions 34c are continuous in the axial direction to form the radially-outer-side magnet holding portions. The first rotor core cooling holes 35a, the second rotor core cooling holes 35b, and the third rotor core cooling holes 35c are continuous in the axial direction to form the rotor core cooling hole 35.

The permanent magnets 23 are each formed into a rectangular parallelepiped having an axial length of the rotor core 22B. The permanent magnets 23 are accommodated in a pair of magnet accommodating holes, in which the first outer wall surfaces 23*a* face the first inner wall surfaces 30*aa*, 30*ab*, and 30*ac*, and the third outer wall surfaces 23*c* are oriented radially outward. Under a state in which the third outer wall surface 23*c* and the fourth outer wall surface 23*d* are in contact with the first to third radially-outer-side magnet holding portions 34*a*, 34*b*, and 34*c* and the first to third radially-inner-side magnet holding portions 32*a*, 31*b*, and 32*c* so that movement of the permanent magnet 23 is restricted in the length direction of the second inner wall surfaces 30*ba*, 30*bb*, and 30*bc*, the second outer wall surface 23*b* is fixed to the second inner wall surfaces 30*ba*, 30*bb*, and 39*bc* with the protrusions 60. First gaps 44 are defined between the first inner wall surfaces 30*aa*, 30*ab*, and 30*ac* of the magnet accommodating holes and the first outer wall surfaces 23*a* of the permanent magnets 23. The radially-outer-side flux barriers 33 and the rotor core cooling holes 35 communicate with each other through the first gaps 44.

Other configurations are similar to those of the first embodiment described above.

Description is given of a method of cooling the permanent magnets 23 in the rotating electric machine 103 having the configuration described above with reference to FIG. 9 to FIG. 11.

The cooling oil 9 is pumped from the refrigerant supply port 41 to the first shaft refrigerant path 36 by an external pump 7 serving as a pressure source, and flows from the second shaft refrigerant path 37 into the communication path 38. A part of the cooling oil 9, which has flowed into the communication path 38, flows into the radially-inner-side flux barriers, and flows in the axial direction along the fourth outer wall surfaces 23*d* of the permanent magnets 23, and is discharged radially outward through the discharge path 39.

The remaining part of the cooling oil 9, which has flowed into the communication path 38, flows into the rotor core cooling holes 35 to flow through the rotor core cooling holes 35 in the axial direction. The openings of the rotor core cooling holes 35 on the load side are closed, and hence the cooling oil 9 flowing through the rotor core cooling holes 35 in the axial direction flows into the first gaps 44 of the first magnet accommodating holes 30Ba, the second magnet accommodating holes 30Bb, and the third magnet accommodating holes 30Bc by a pumping force of the pump 7 and a centrifugal force generated by rotations of the rotor 20B.

The cooling oil 9, which has flowed into the first gaps of the first magnet accommodating holes 30Ba, flows along the protrusions 60 to the counter load side, and flows into the first gaps 44 between the protrusions 60 at the radially-inner-sides and at the centers of the second magnet accommodating holes 30Bb. The cooling oil 9, which has flowed into the first gaps 44 of the second magnet accommodating holes 30Bb, flows into the first gaps 44 between the two protrusions 60 of the third magnet accommodating holes 30Bc. The cooling oil 9, which has flowed into the first gaps 44 between the two protrusions 60 of the third magnet accommodating holes 30Bc, is turned to flow toward the load side, and flows into the first gaps 44 between the protrusions 60 at the centers and at the radially outer sides of the second magnet accommodating holes 30Bb. The cooling oil 9, which has flowed into the first gaps 44 of the second magnet accommodating holes 30Bb, flows into the first gaps 44 on the radially outer sides of the protrusions 60 of the first magnet accommodating holes 30Ba. Thus, as indicated by the arrows of FIG. 12, the cooling oil 9 flows to alternately repeat the flow in the load-side direction and the flow in the counter-load-side direction along the first outer wall surfaces 23*a* of the permanent magnets 23, and flows into the radially-outer-side flux barrier 33. The cooling oil 9, which has flowed into the radially-outer-side flux barrier 33, flows along the third outer wall surfaces 23*c* of the permanent magnets 23 in the axial direction, and is discharged radially outward through the discharge path 39. Meanwhile, the cooling oil 9, which has flowed into the first gaps 44 of the second magnet accommodating holes 30Bb and the third magnet accommodating holes 30Bc, flows along the first outer wall surfaces 23*a* of the permanent magnets 23 in the axial direction, and is merged with the cooling oil 9, which has flowed into the first gaps 44 of the first magnet accommodating holes 30Ba.

The cooling oil 9, which has been discharged from the discharge path 39, is scattered by the centrifugal force, and after cooling load-side coil ends of the stator coil 12, is dropped to be accumulated on the lower end side in the inner space of the housing 1 in the vertical direction. The cooling oil 9 accumulated on the lower end side in the inner space of the housing 1 in the vertical direction is discharged from the refrigerant discharge port 42, and is returned to the pump 7 through an oil cooler 8. On this occasion, the cooling oil 9 accumulated on the load side of the stator 10 flows toward the counter load side of the stator 10 through the axial communication path 40.

The path extending through the first to third radially-inner-side flux barriers 31*a*, 31*b*, and 31*c* to the discharge path 39 and the path extending through the rotor core cooling holes 35, the first gaps 44, and the radially-outer-side flux barriers 33 to the discharge path 39 are independent of each other.

Therefore, also in the seventh embodiment, an effect similar to that of the first embodiment can be attained. According to the seventh embodiment, the second outer wall surfaces 23*b* of the permanent magnets 23 are fixed to the second inner wall surfaces 30*ba*, 30*bb*, and 30*bc* by the protrusions 60, and the permanent magnets 23 are held in the magnet accommodating holes. Therefore, the adhesive for fixing the permanent magnets 23 is unnecessary, thereby being capable of reducing the cost.

According to the seventh embodiment, the meandering refrigerant flow path is formed, in which the flow paths extending on the load side and the flow paths extending on the counter load side are alternately repeated in the length directions of the first inner wall surfaces 30*aa*, 30*ab*, and 30*ac* by the protrusions 60 formed in the first inner wall surfaces 30*aa*, 30*ab*, and 30*ac* of the first to third magnet accommodating holes 30Ba, Bb, and Bc. Thus, the flow path length of the cooling oil 9 along the first outer wall surfaces 23*a* of the permanent magnets 23 becomes longer, and heat generated in the permanent magnets 23 can be effectively radiated.

In the sixth and seventh embodiments described above, the rotor core is divided into five or three segments in the axial direction, but the number of divisions of the rotor core is not limited thereto.

Further, in the sixth and seventh embodiments, the rotor core of the first embodiment is divided into five or three segments in the axial direction, but the rotor cores of the second to fifth embodiments may each be divided into five or three segments in the axial direction.

Eighth Embodiment

Figure 16:
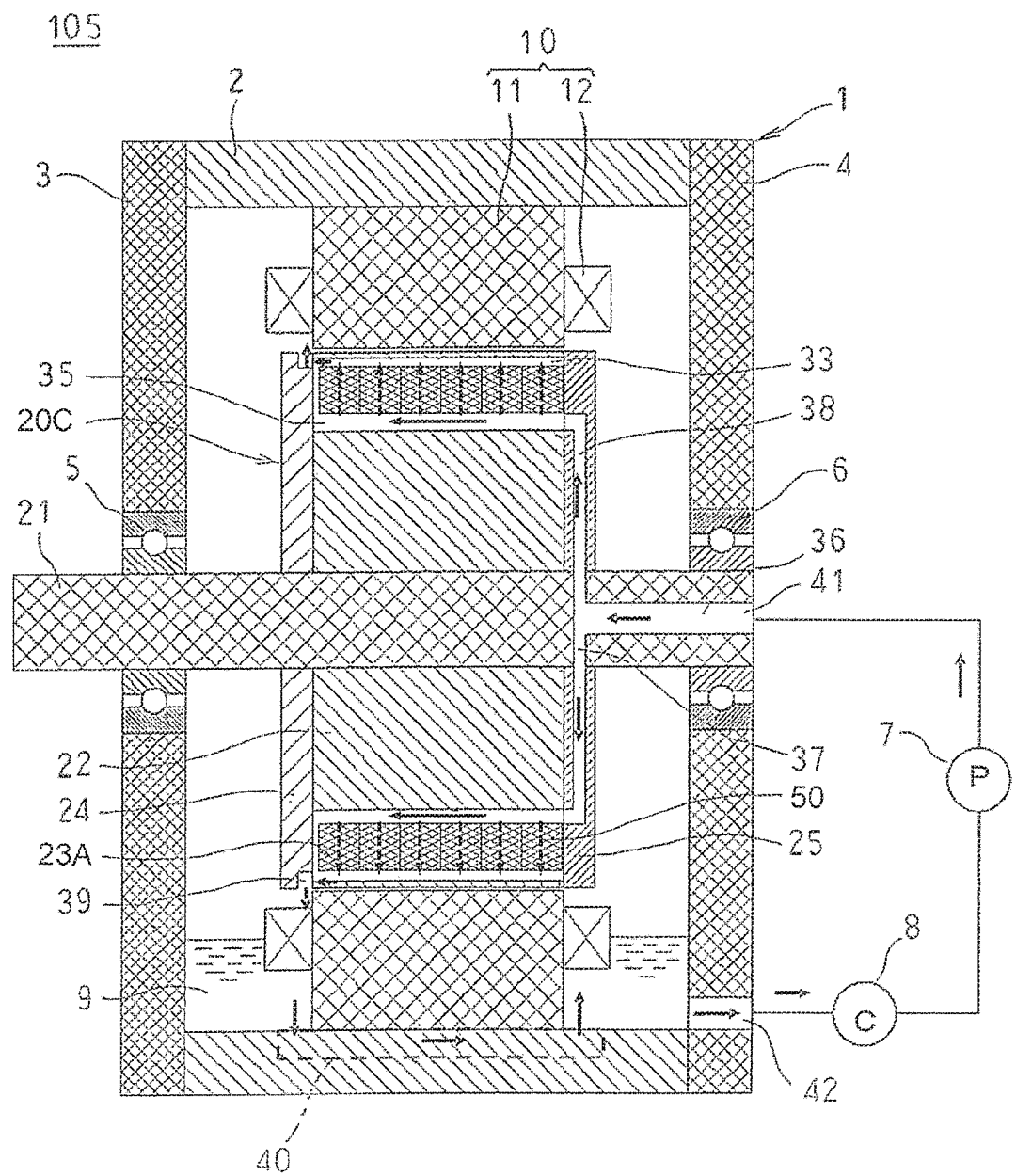
FIG. 16 is a longitudinal sectional view for illustrating a rotating electric machine according to an eighth embodiment of the present invention.

FIG. 16 is a longitudinal sectional view for illustrating a rotating electric machine according to an eighth embodiment of the present invention. In FIG. 16, arrows indicate flows of cooling oil.

In FIG. 16, a permanent magnet 23A is formed by arranging six magnet blocks 50 in the axial direction while being in contact with each other, and is formed into a rectangular parallelepiped having an axial length of the rotor core 22. The six magnet blocks 50 are arranged in the magnet accommodating holes 30 so to be close to the counter load side and in contact with the counter-load-side end plate 25.

Other configurations are similar to those of the first embodiment described above.

For example, when a gap is defined between the counter-load-side end plate 25 and the permanent magnet 2A, the cooling oil 9 flows into the gap between the load-side end plate 24 and the permanent magnet 2A by the pumping force of the pump 7 and a centrifugal force generated by rotations of a rotor 20C. Thus, the cooling oil 9 flows into the gap between the load-side end plate 24 and the permanent magnet 2A, and hence a flow rate of the cooling oil 9 which flows along the first outer wall surfaces 23a of the permanent magnet 23A becomes smaller.

In a rotating electric machine 105 having the configuration described above, the six magnet blocks 50 are arranged in the magnet accommodating holes 30 so as to be close to the counter load side and in contact with the counter-load-side end plate 25. Therefore, even when the permanent magnet 23A is formed so as to be shorter than the axial length of the rotor core 22 within a range of dimensional tolerance, the permanent magnet 23A is in contact with the counter-load-side end plate 25. Thus, the gap is defined between the load-side end plate 24 and the permanent magnet 23A, but a gap is not defined between the counter-load-side end plate 25 and the permanent magnet 23A. Therefore, the cooling oil 9 flowing in the rotor core cooling holes 35 in the axial direction flows into the first gaps 44 by the pumping force of the pump 7 and the centrifugal force generated by rotations of the rotor 20C. With this configuration, the flow rate of the cooling oil 9 flowing along the first outer wall surfaces 23a of the permanent magnet 23A is ensured, and a decrease in cooling of the permanent magnet 23A is suppressed. The permanent magnet 23A is divided in the axial direction, and hence an eddy current loss in the permanent magnet 23A can be reduced.

In the eighth embodiment described above, the permanent magnet of the rotating electric machine of the first embodiment is divided into the plurality of magnet blocks in the axial direction, but the permanent magnets of the rotating electric machine of the second embodiment to the seventh embodiment may be divided into a plurality of magnet blocks in the axial direction.

Further, in each of the embodiments described above, the rotor core formed of the laminated cores is described, but the rotor core may be formed of a mass core.

Still further, in the sixth and the seventh embodiment described above, the rotor core is divided into a plurality of segments in the axial direction, but all of the divided plurality of rotor cores may be formed of laminated cores or a mass core, or the laminated cores and the mass core may be mixed to form the divided plurality of rotor cores.

REFERENCE SIGNS LIST 7 pump (pressure source); 9 cooling oil (refrigerant); 10 stator; 20, 20A, 20B, 20C rotor; 21 shaft; 22, 22A, 22B rotor core; 23, 23A permanent magnet; 23a first outer wall surface; 23b second outer wall surface; 23c third outer wall surface; 23d fourth outer wall surface; 24, 24A, 24B load-side end plate; 25, 25A, 25B counter-load-side end plate; 30 magnet accommodating hole; 30a first inner wall surface, 30b second inner wall surface; 31, 31A radially-inner-side flux barrier; 31B radially-inner-side flux barrier (first rotor core cooling hole); 32 radially-inner-side magnet holding portion; 33 radially-outer-side flux barrier (radially-outer-side refrigerant flow path); 34 radially-outer-side magnet holding portion; 35, 35A rotor core cooling hole; 36 first shaft refrigerant path (refrigerant supply path); 37 second shaft refrigerant path (refrigerant supply path); 38 communication path; 39 discharge path; 50 magnet block

The invention claimed is:

1. A rotating electric machine, comprising:
a rotor including:
a rotor core, which is firmly fixed to a shaft, and has a plurality of magnet accommodating holes, which penetrate the rotor core in an axial direction, in a circumferential direction;
a first end plate and a second end plate mounted to the shaft under a state of being in contact with both end surfaces of the rotor core in the axial direction; and
permanent magnets accommodated in the magnet accommodating holes; and a stator arranged coaxially with the rotor on an outer peripheral side of the rotor,
wherein the magnet accommodating holes each have a first inner wall surface and a second inner wall surface facing each other in parallel, and a length direction orthogonal to an axial direction of the first inner wall surface is inclined in a circumferential direction with respect to a radial direction,
wherein each of the permanent magnets is formed so as to have a rectangular cross-section, includes a first outer wall surface and a second outer wall surface, which are formed by a pair of long sides of the rectangular cross-section, and a third outer wall surface and a fourth outer wall surface, which are formed by a pair of short sides of the rectangular cross-section, and is accommodated in the magnet accommodating hole while a first gap is defined between
the first outer wall surface and the first inner wall surface, and the third outer wall surface is oriented radially outward,
wherein the rotor core has a rotor core cooling hole formed so as to penetrate the rotor core in the axial direction under a state of being coupled to the first gap at a position on a radially inner side with respect to a center portion of the first inner wall surface in the length direction,
wherein the rotor core has a radially-outer-side refrigerant flow path formed so as to penetrate the rotor core in the axial direction along the third outer wall surface of the permanent magnet under a state of being coupled to a radially-outer-side end portion of the first gap,
wherein the radially-outer-side refrigerant flow path and the rotor core cooling hole communicate with each other through the first gap,
wherein the first end plate has a communication path formed so as to extend from an inner end surface of the first end plate to the rotor core cooling hole,
wherein the second end plate has a discharge path formed so as to allow the radially-outer-side refrigerant flow path to communicate with an outside, and
wherein the shaft has a refrigerant supply path for allowing a refrigerant so as to be supplied from a pressure source to the communication path.

2. The rotating electric machine according to claim 1, wherein the rotor core cooling hole is coupled to a radially-inner-side end portion of the first gap.

3. The rotating electrical machine according to claim 1, wherein the second outer wall surface of the permanent magnet is fixed to the second inner wall surface of the magnet accommodating hole.

4. The rotating electric machine according to claim 3, wherein the radially-outer-side refrigerant flow path comprises a radially-outer-side flux barrier, which is formed so as to be continuous to a radially outer side of the first inner wall surface of the magnet accommodating hole in the length direction and penetrate the rotor core in the axial direction.

5. The rotating electric machine according to claim 4, wherein a radially-outer-side magnet holding portion protrudes from a radially-outer-side end portion of the second inner wall surface so as to be in contact with an end portion of the third outer wall surface of the permanent magnet on a side of the second outer wall surface.

6. The rotating electrical machine according to claim 3, wherein the rotor core cooling hole comprises a radially-inner-side flux barrier which is formed so as to be continuous to a radially outer side of the first inner wall surface of the magnet accommodating hole in the length direction and penetrate the rotor core in the axial direction.

7. The rotating electrical machine according to claim 3,
wherein a radially-inner-side flux barrier is formed so as to be continuous to a radially-inner-side of the second inner wall surface of the magnet accommodating hole in the length direction and penetrate the rotor core in the axial direction,
wherein a radially-inner-side magnet holding portion protrudes from a radially-inner-side end portion of the first inner wall surface so as to be in contact with an end portion of the fourth outer wall surface of the permanent magnet on a side of the first outer wall surface, and
wherein the radially-inner-side flux barrier is coupled to the communication path and the discharge path.

8. The rotating electrical machine according to claim 1, wherein the permanent magnet is in contact with the first end plate.

9. The rotating electrical machine according to claim 8, wherein the permanent magnet is formed of magnet blocks arrayed in the axial direction while being in contact with each other, and is in contact with the first end plate and apart from the second end plate.

10. The rotating electrical machine according to claim 1, wherein the permanent magnet is held at both end portions thereof in the axial direction by the first end plate and the second end plate so as to be accommodated in the magnet accommodating hole.

11. The rotating electrical machine according to claim 1,
wherein a pair of magnet accommodating holes are arranged in a V-shape arrangement, in which the length directions of the first inner wall surfaces are inclined toward opposite sides in the circumferential direction with respect to a radial direction so that a distance between the first inner wall surfaces in the circumferential direction gradually increase toward a radially outer side, and pairs of the magnet accommodating holes are arrayed at equal angle pitches in the circumferential direction, and
wherein one pole is formed by the permanent magnets accommodated in the pair of permanent magnet holes.

12. The rotating electrical machine according to claim 1, wherein the rotor core is formed of one type of magnetic plates laminated in the axial direction.

13. The rotating electrical machine according to claim 1, wherein the first inner wall surface has a protrusion in contact with the permanent magnet.

14. The rotating electrical machine according to claim 13, wherein the rotor core is formed of a plurality of types of magnetic plates laminated in the axial direction.

15. The rotating electrical machine according to claim 1, wherein the rotor core cooling hole is formed so as to penetrate the rotor core in the axial direction under a state of protruding away from the first inner wall surface at a position on a radially inner side with respect to a center portion of the first inner wall surface in the length direction.

\* \* \* \* \*